US009025561B2

(12) United States Patent
Kawamura

(10) Patent No.: US 9,025,561 B2
(45) Date of Patent: May 5, 2015

(54) TRANSMITTER, RECEIVER AND RADIO COMMUNICATION METHOD

(75) Inventor: Teruo Kawamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 178 days.

(21) Appl. No.: 13/813,661

(22) PCT Filed: Aug. 10, 2011

(86) PCT No.: PCT/JP2011/068272
§ 371 (c)(1), (2), (4) Date: Feb. 20, 2013

(87) PCT Pub. No.: WO2012/020797
PCT Pub. Date: Feb. 16, 2012

(65) Prior Publication Data

US 2013/0176987 A1 Jul. 11, 2013

(30) Foreign Application Priority Data

Aug. 10, 2010 (JP) ................................ 2010-179584

(51) Int. Cl.

| | |
|---|---|
| ***H04W 4/00*** | (2009.01) |
| ***H04Q 11/02*** | (2006.01) |
| ***H04J 4/00*** | (2006.01) |
| ***H04W 72/04*** | (2009.01) |
| *H04L 5/00* | (2006.01) |
| *H04L 1/00* | (2006.01) |
| *H04L 1/18* | (2006.01) |
| *H04L 5/02* | (2006.01) |

(52) U.S. Cl.
CPC ......... *H04W 72/0446* (2013.01); *H04L 5/0023* (2013.01); *H04L 1/0026* (2013.01); *H04L 1/1861* (2013.01); *H04L 5/026* (2013.01); *H04L 5/005* (2013.01); *H04L 5/0051* (2013.01)

(58) Field of Classification Search
CPC .......... H04W 72/0446; H04L 27/2426; H04L 27/2647; H04L 1/08; H04L 5/003
USPC .......................................... 370/340, 330, 478
See application file for complete search history.

(56) References Cited

U.S. PATENT DOCUMENTS

| | | | | |
|---|---|---|---|---|
| 2009/0199076 | A1* | 8/2009 | Boer et al. | 714/799 |
| 2010/0195700 | A1* | 8/2010 | Ogawa et al. | 375/132 |
| 2012/0108254 | A1* | 5/2012 | Kwon et al. | 455/450 |

OTHER PUBLICATIONS

International Search Report issued in PCT/JP2011/068272 mailed Sep. 20, 2011 (3 pages).

3GPP TS 36.211 V10.2.0; "3rd Generation Partnership Project; Technical Specification Group Radio Access Network; Evolved Universal Terrestrial Radio Access (E-UTRA); Physical Channels and Modulation (Release 10)"; Jun. 2011 (103 pages).

* cited by examiner

*Primary Examiner* — Ronald B Abelson
(74) *Attorney, Agent, or Firm* — Osha Liang LLP

(57) ABSTRACT

The present invention aims to provide a transmitter, a receiver and a radio communication method capable of preventing any increase in overhead due to insertion of reference signals without deteriorating the channel estimation accuracy. The radio communication method is provided for mapping reference signals to radio resources of a plurality of layers and transmitting the reference signals, having the steps of: generating the reference signals; oversampling the reference signals; and mapping the oversampled reference signals to resource elements of the layers respectively. Reference signals to be mapped to different layers are subjected to frequency division multiplexing in resource elements of same time and frequency domains.

14 Claims, 18 Drawing Sheets

FREQUENCY
OFDM SYMBOL
LAYER#1
SUBCARRIER
TIME
DATA
RS
LAYER#2
LAYER#3
LAYER#4

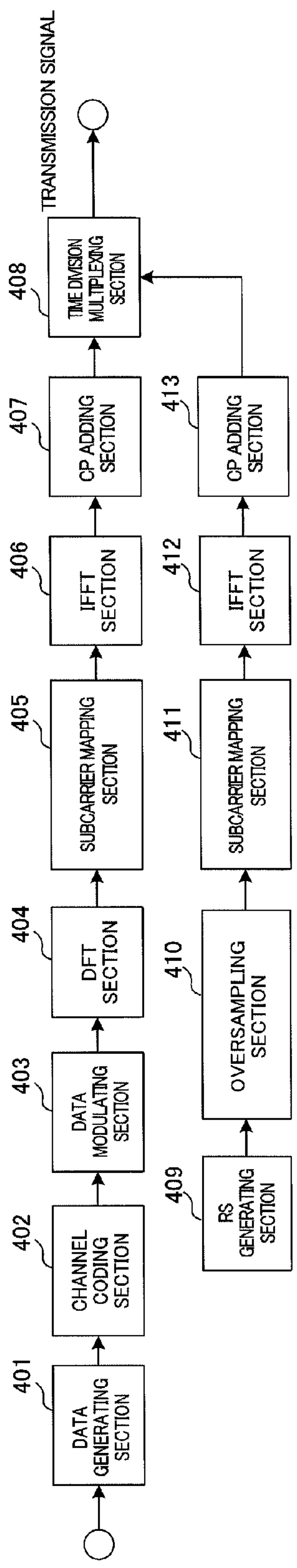
FIG. 16A TRANSMITTER
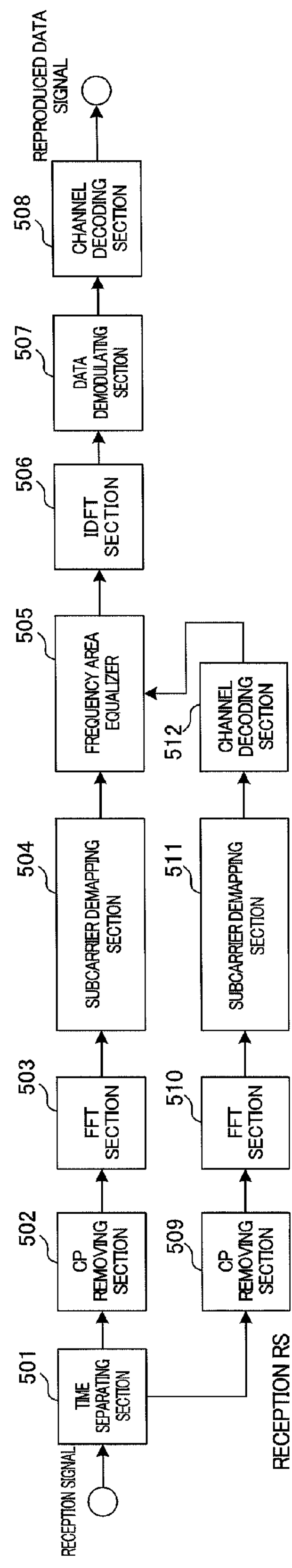
FIG. 16B RECEIVER

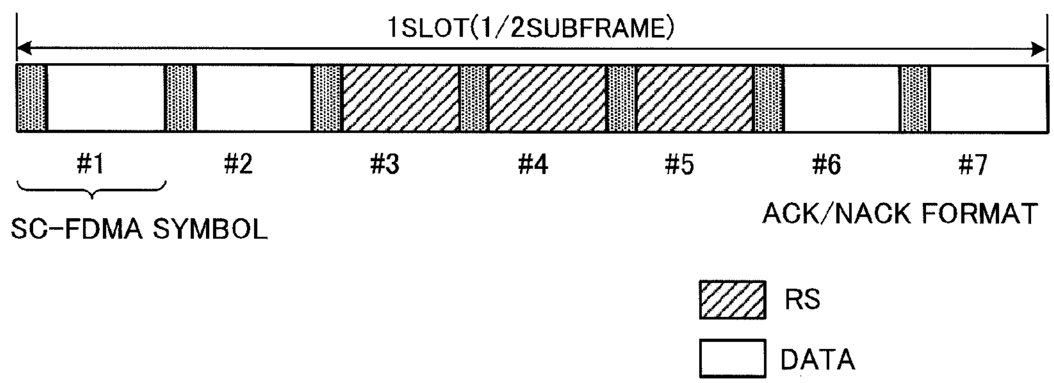
FIG.17A
FREQUENCY
FIG.17B
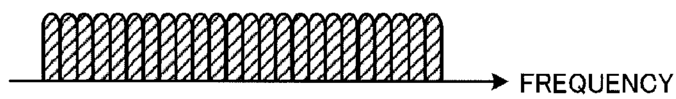
FIG.17C
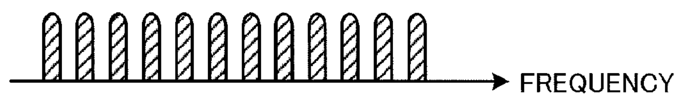
FIG.17D

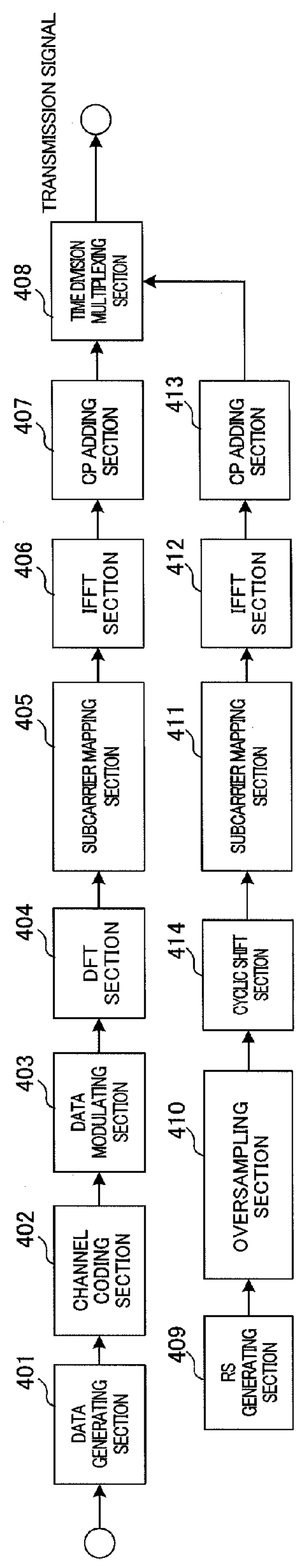
FIG. 18A TRANSMITTER
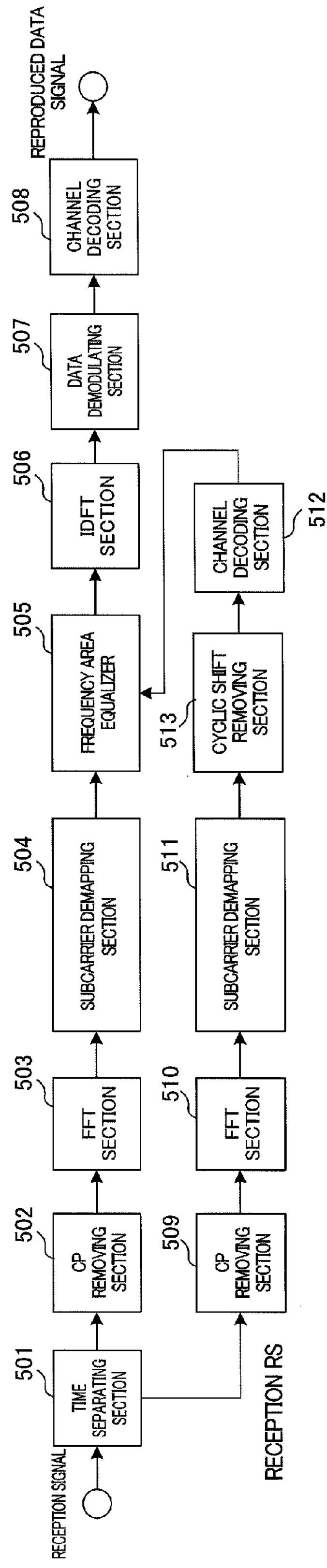
FIG. 18B RECEIVER

TRANSMITTER, RECEIVER AND RADIO COMMUNICATION METHOD

TECHNICAL FIELD

The present invention relates to a transmitter, a receiver and a radio communication method.

BACKGROUND ART

In a UMTS (Universal Mobile Telecommunications System) network, for the purposes of improving spectral efficiency and improving the peak data rates, high speed packet access based on W-CDMA (Wideband Code Division Multiple Access) has been realized by adopting HSDPA (High Speed Downlink Packet Access) and HSUPA (High Speed Uplink Packet Access). In comparison to the call switching mode using W-CDMA individual channels, in HSDPA/HSUPA, a shared channel is used to transmit user information thereby to be able to allocate radio resources with high efficiency and low delay. In order to further increase the HSDPA/HSUPA peak data rates, spectrum efficiency and capacity, specifications of radio interface of a long term advanced system called Long-Term Evolution (LTE) are completed in 3GPP (3rd Generation Partnership Project). In the LTE system, the OFDMA (Orthogonal Frequency Division Multiple Access) is employed for the downlink and the SC-FDMA (Single Carrier-Frequency Division Multiple Access) is employed for the uplink. Besides, in order to share the processing and radio parameters with the downlink, uplink SC-FDMA signals are generated by the frequency domain processing using DFT (Discrete Fourier Transform)-Spread OFDMA.

In addition, in LTE, synchronous detection is employed using a reference signal (RS) of which the modulation phase is known in a receiver (it is called “RS” in LTE specifications though it is called “pilot signal” in W-CDMA). In the downlink OFDMA, multicarrier signals are employed, and RS symbols are multiplexed in discrete resource elements (RE) in time and frequency domains in a resource block (RB) (see Non Patent Literature 1). In the meantime, in the uplink, in order to maintain a single carrier signal, a block in which an RS is mapped to an SC-FDMA symbol is time division multiplexed with a block to which an information symbol is mapped (Non Patent Literature 1). For example, the RS is received by a mobile terminal apparatus thereby enabling synchronous detection of a downlink signal. The RS is subjected to scrambling by a cell-specific scrambling signal (randomized by an existing signal sequence).

CITATION LIST

Non Patent Literature

Non-Patent Literature 1: 3GPP, TS36.211

SUMMARY OF INVENTION

Technical Problem

By the way, in order to realize higher peak data rates, spectrum efficiency, capacity and cell-edge user throughputs than those of the LTE system, consideration is given to LTE-Advanced (LTE-A) radio interface specifications. Particularly, realization of the peak data rates of 1 Gbps for the downlink and 500 Mbps or more for the uplink has been under study. And, in LTE-A, it is an important requirement to have backward compatibility with 3GPP Release 8 or later LTE systems. That is, it is necessary to establish radio link connection with LTE user terminals (UE: User Equipment) in a LTE-A frequency band. Accordingly, a plurality of fundamental frequency blocks (CCs: Component Carriers), each of which is an LTE transmission band, are aligned in plural to form a transmission band. And, in order for an LTE user terminal (UE) to be able to demodulate user information, the RS in LTE is multiplexed in a RB. Particularly, the cell-specific RS (CS-RS) is multiplexed to each of RBs. In order to meet requirements of higher peak data rates and capacity described above, in the LTE-A, MIMO (Multiple-Input Multiple-Output) channel transmission using eight transmission/reception antennas at the maximum is adopted for the downlink, and MIMO channel transmission using four transmission/reception antennas at the maximum is adopted for the uplink. Then, the downlink peak data rate of 1 Gbps and peak spectrum efficiency of 30 bits/second/Hz are realized by 8×8 MIMO multiplexing and the uplink peak data rate of 500 Mbps and peak spectrum efficiency of 15 bits/second/Hz are realized by 4×4 MIMO multiplexing.

In the Release 8 LTE downlink, the CS-RS is defined for up-to-four transmission antennas at the maximum. However, in the LTE-A system, the RS needs to support eight antennas at the maximum. In the meantime, in the downlink MIMO multiplexing, precoding is adopted for generating directive beams and improving antenna gains. Accordingly, if RS symbols with or without precoding are provided for eight antennas, overhead of an RS in a limited RB is increased greatly. Then, in LTE-A, there are newly specified an RS for measuring reception quality of UE in a cell (CSI-RS: Channel State Information RS), which is transmitted without precoding, and a UE-specific US (US-RS) for demodulating to perform UE-specific precoding.

The CSI-RS is used in measuring channel quality required for allocation of PDSCH (Physical Downlink Shared Channel) RBs, that is, scheduling, selection of a modulation system and channel coding rate, handover and so on. On the other hand, the US-RS is subjected to precoding in the same manner as the PDSCH RB transmitted to the UE, transmitted and used for channel estimation for synchronous detection.

As described above, in MIMO multiplexing or transmission diversity (MIMO diversity), RS symbols are required to be equal in number to transmission antennas. In this case, in the CSI-RS, measurement accuracy of reception channel quality is not so high and can be thinned out in the time domain as specified in LTE-A. However, measurement accuracy of the reception channel quality in high speed moving environments is deteriorated. On the other hand, the estimation accuracy of US-RS for synchronous detection or demodulation has a great effect on the signal separation accuracy in MIMO multiplexing and transmission diversity gains, and it needs to be high. Accordingly, the US-RS for demodulation principally needs to be multiplexed per antenna. However, with increase in number of transmission antennas, overhead of RS, particularly, US-RS (insertion loss) is increased and it is necessary to reduce RS overhead without bringing about deterioration of the channel estimation accuracy.

The present invention was carried out in view of the foregoing and aims to provide a transmitter, a receiver and a radio communication method that are all capable of preventing increase in overhead caused by insertion of reference signals.

Solution to Problem

An aspect of a radio communication method of the present invention is a radio communication method for mapping reference signals to radio resources of a plurality of layers and transmitting the reference signals, the radio communication method comprising the steps of: generating the reference signals; oversampling the reference signals; and mapping the reference signals oversampled, to resource elements of the layers respectively, wherein reference signals of the respective layers are mapped to resource elements of same time and frequency domains in such a manner that the reference signals are separated from each other in the frequency direction.

Another aspect of the radio communication method of the present invention is a radio communication method for mapping reference signals to radio resources of a plurality of layers and transmitting the reference signals, the radio communication method comprising the steps of: generating the reference signals; oversampling the reference signals; applying cyclic shifts to the reference signals oversampled; and mapping the reference signals applied with the cyclic shifts, to resource elements of the layers respectively, wherein a plurality of same reference signals are mapped along a frequency direction in each of resource elements of same time and frequency domains in respective layers and reference signals of the respective layers are cyclic shift multiplexed.

Still another aspect of the radio communication method of the present invention is a radio communication method for mapping reference signals to radio resources of a plurality of layers and transmitting the reference signals, the radio communication method comprising the steps of: generating the reference signals; oversampling the reference signals; orthogonally coding the reference signals oversampled; and mapping the reference signals orthogonally coded, to resource elements of the layers respectively, wherein reference signals of the respective layers are mapped to resource elements of same time and frequency domains and multiplexed with use of orthogonal codes.

According to the above-described radio communication method, it is possible to reduce the area of reference signals mapped to the respective layers and prevent any increase in overhead by insertion of reference signals.

An aspect of a transmitter of the present invention is a transmitter is a transmitter for mapping reference signals to radio resources of a plurality of layers and transmitting the reference signals, the transmitter comprising: a reference signal generating section configured to generate the reference signals; an oversampling section configured to perform oversampling on the reference signals; and a subcarrier mapping section configured to map the reference signals oversampled, to resource elements (subcarriers) of the layers respectively, wherein the subcarrier mapping section maps reference signals of the respective layers to resource elements of same time and frequency domains in such a manner that the reference signals are separated from each other in the frequency direction.

Another aspect of the transmitter of the present invention is a transmitter for mapping reference signals to radio resources of a plurality of layers and transmitting the reference signals, the transmitter comprising: a reference signal generating section configured to generate the reference signals; an oversampling section configured to perform oversampling on the reference signals; a cyclic shift section configured to apply cyclic shifts to the reference signals oversampled; and a subcarrier mapping section configured to map the reference signals applied with the cyclic shifts, to resource elements of the layers respectively, wherein a plurality of same reference signals are mapped along a frequency direction in each of resource elements of same time and frequency domains in respective layers and reference signals of the respective layers are cyclic shift multiplexed.

Still another aspect of the transmitter of the present invention is a transmitter for mapping reference signals to radio resources of a plurality of layers and transmitting the reference signals, the transmitter comprising: a reference signal generating section configured to generate the reference signals; an oversampling section configured to perform oversampling on the reference signals; an orthogonal code multiplying section configured to orthogonally coding the oversampled reference signals; and a subcarrier mapping section configured to map the reference signals orthogonally coded, to resource elements of the layers respectively, wherein reference signals of the respective layers are mapped to resource elements of same time and frequency domains and multiplexed with use of orthogonal codes.

A receiver of the present invention is a receiver for receiving signals including reference signals oversampled and mapped to radio resources of a plurality of layers, the receiver comprising: a subcarrier demapping section configured to demap the received signals; a downsampling section configured to perform downsampling the reference signals in the demapped signals; a channel estimating section for performing channel estimation with use of the reference signals downsampled in the downsampling section.

Advantageous Effects of Invention

According to the present invention, as it is possible to reduce the area of reference signals mapped to respective layers, it is possible to suppress increase in overhead caused by insertion of reference signals without deterioration of channel estimation accuracy and to prevent reduction in transmission efficiency.

BRIEF DESCRIPTION OF DRAWINGS

FIG. 16 provides examples of functional block diagrams of a transmitter and a receiver that perform radio communications by application of the mapping method of reference signals according to the embodiment 1 to the uplink SC-FDMA;

FIG. 17 provides diagrams for explaining the number of subcarriers where the mapping methods of reference signals according to the embodiments 1 and 2 are applied to the uplink SC-FDMA; and FIG. 18 provides examples of functional block diagrams of a transmitter and a receiver that perform radio communications by application of the mapping method of reference signals according to the embodiment 2 to the uplink SC-FDMA.

DESCRIPTION OF EMBODIMENTS

Figure 1:
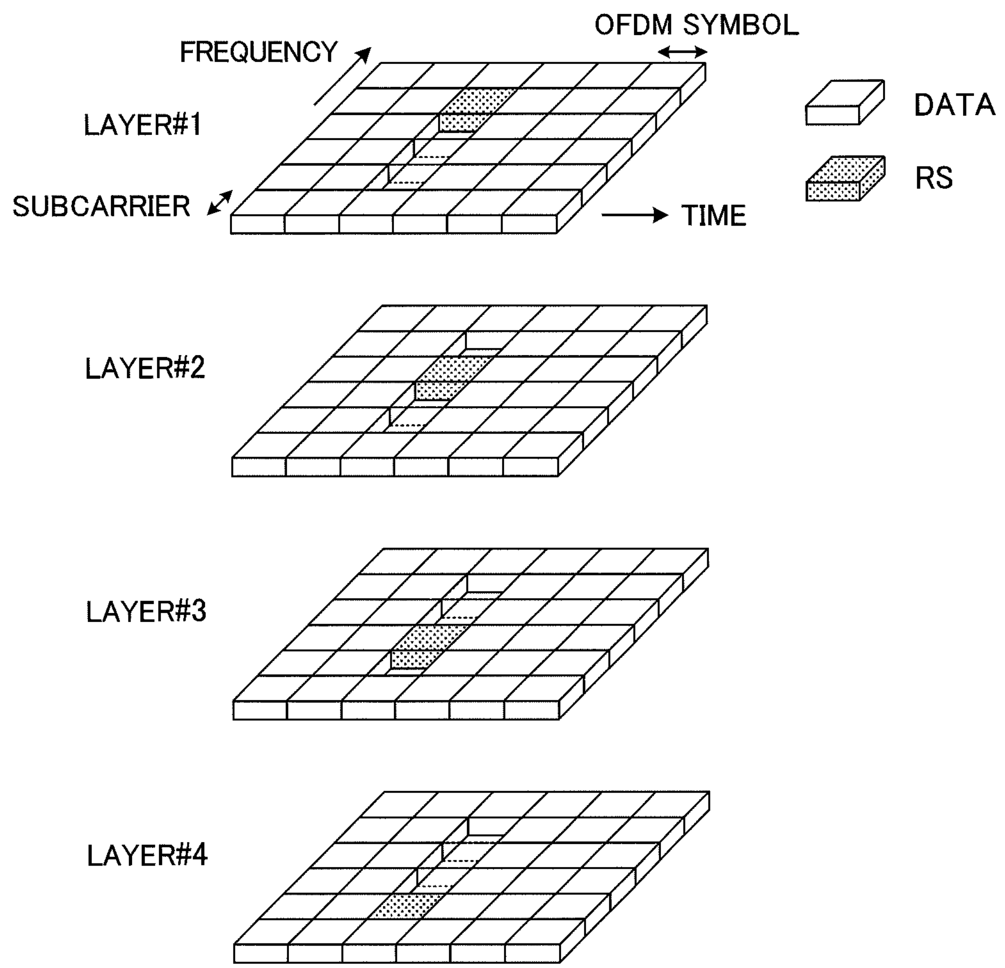
FIG. 1 is a diagram illustrating an orthogonal multiplexing method of reference signals by frequency division multiplexing (FDM)

First description is made about a method of orthogonalizing reference signals on the downlink between transmission antennas (or some cells). The method for orthogonalizing reference signals (orthogonalization processing) includes frequency division multiplexing (see FIG. 1), time division multiplexing (see FIG. 2) and code division multiplexing (see FIG. 3), FIG. 1 illustrates the case of FDM (Frequency Division Multiplexing) performed on reference signals. In FDM, reference signals (RSs) of respective transmission layers are multiplexed with use of different subcarriers and data signals (Data) are mapped in such a manner as to prevent the reference signals from interfering with the data signals. As the reference signals are thus mapped in the respective layers, they can be orthogonalized between transmission antennas and prevented from interfering with the data signals.

Figure 2:
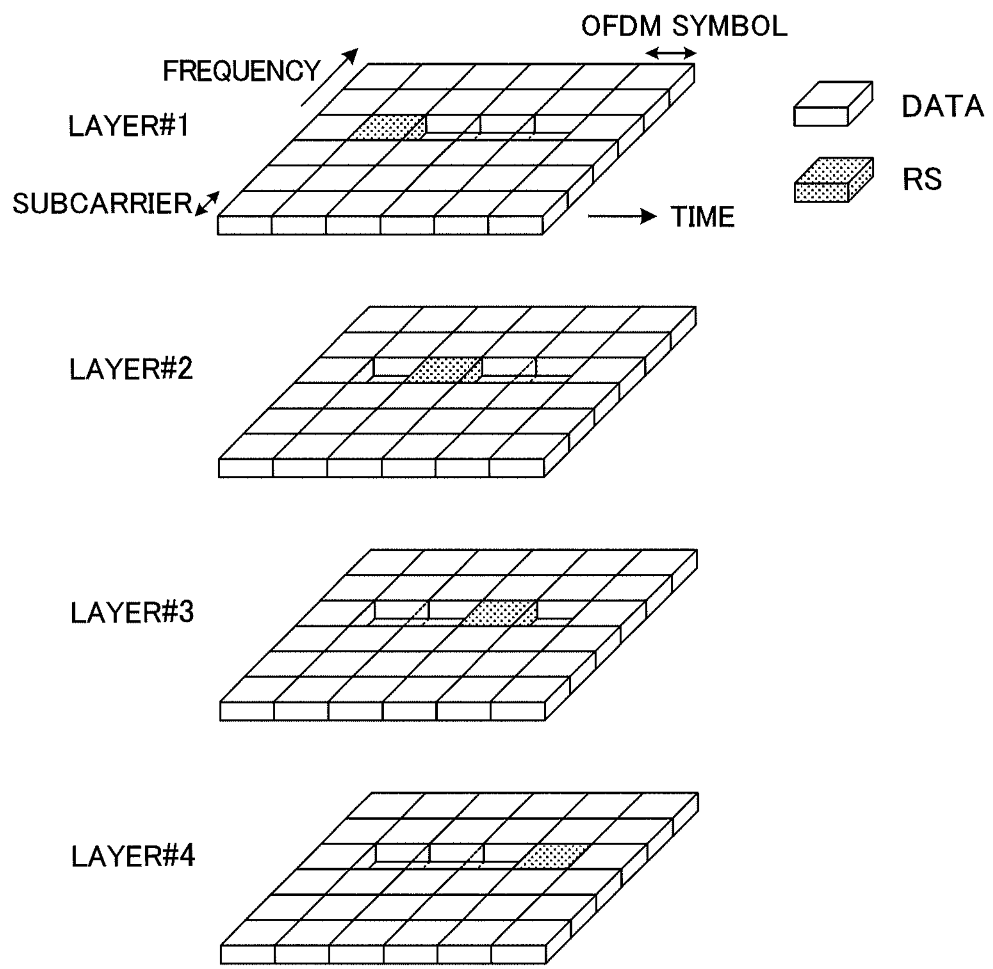
FIG. 2 is a diagram illustrating an orthogonal multiplexing method of reference signals by time division multiplexing (TDM)

FIG. 2 illustrates the case of TDM (Time Division Multiplexing) performed on reference signals. In TDM, reference signals (RSs) of respective transmission layers are multiplexed with use of subcarriers in different OFDM symbols and data signals are mapped in such a manner as to prevent the reference signals from interfering with the data signals. As the reference signals are thus mapped in the respective layers, they can be orthogonalized between transmission antennas and prevented from interfering with the data signals.

Figure 3:
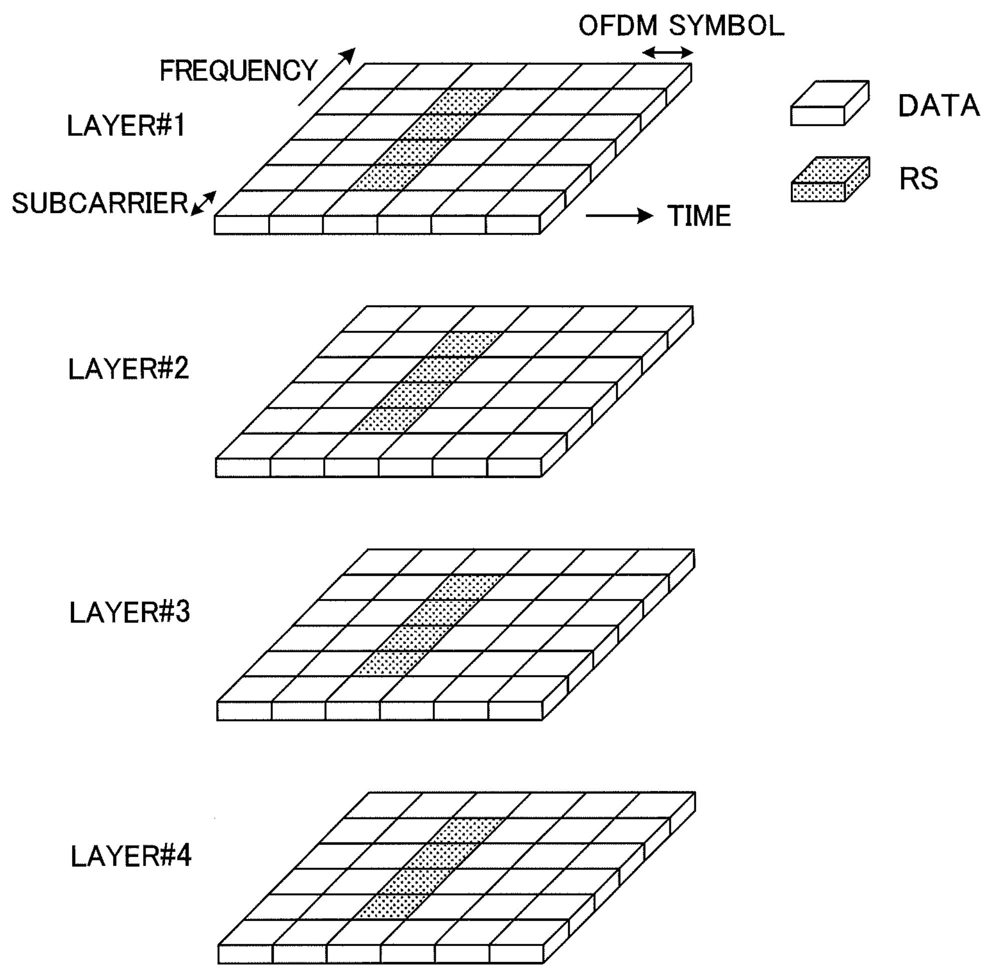
FIG. 3 is a diagram illustrating an orthogonal multiplexing method of reference signals by code division multiplexing (CDM)

FIG. 3 illustrates the case of CDM (Code Division Multiplexing) performed on reference signals. In CDM, reference signals (RSs) of respective transmission layers are arranged over four subcarriers of the same OFDM symbol and multiplexed with use of orthogonal codes between the transmission antennas. Data signals are mapped in such a manner as to prevent the reference signals from interfering with the data signals. As the reference signals are thus mapped in the respective layers, they can be orthogonalized between the transmission antennas and prevented from interfering with the data signals.

As described above, by using FDM, TDM and CDM, it is possible to make the reference signals orthogonal between transmission antennas and to prevent the reference signals from interfering with other data. However, when the reference signals are orthogonalized between the transmission antennas by any of these methods, increase in number of transmission antennas and addition of new reference signals cause further increase in overhead, which may cause reduction in transmission efficiency. In order to reduce the overhead, RS insertion interval may be increased, however this increase in RS insertion interval causes deterioration in tracking performance of channel fluctuations, bringing about deterioration of channel estimation accuracy. Then, studying a method of suppressing any increase in overhead caused by insertion of reference signals even when the transmission antennas are increased in number or new reference signals are added, the present inventors have found the idea of performing the oversampling processing on reference signals of respective layers and multiplexing the oversampled reference signals and finally achieved the present invention.

The following is detailed description embodiments of the present invention, made with reference to the accompanying drawings. The embodiments are described by way of example where the present invention is applied to LTE-A, however, this example is by no means intended to limit the present invention. And, application of the present invention is not limited to a particular reference signal but may be applied to various reference signals (for example, downlink reference signals (CSI-RSs, US-RSs and the like), and uplink reference signals).

As one example, advantageous effects (merits) of the present invention applied to the PUCCH (Physical Uplink Control Channel) are explained below. The PUCCH is used to transmit reception channel quality information (CQI: Channel Quality Indicator) measured by the UE and downlink PDSCH transmission acknowledgement information (ACK/NACK: ACKnowledgement/Negative ACKnowledgement). These information pieces are both transmitted in 12-subcarrier band. When transmitting ACK/NACK information, 3 SC-FDMA symbols out of 7 SC-FDMA symbols in one slot are used for RSs. In one SC-FDMA symbol, orthogonal CDMA using 12 cyclic shifts is defined, and when allocation of orthogonal codes in time domain is further employed for 3 SC-FDMA symbols, 36 (12×3) channels can be multiplexed at the maximum. In the meantime, as ACK/NACK signals are transmitted using 4 SC-FDMA symbols other than the RS in one slot, 48 channels (12×4) can be multiplexed. Accordingly, the maximum multiplexing number depends on the number of multiplexed RS signals. Then, by application of the present invention, the number of effective subcarriers for RSs becomes, for example, twice or 24, orthogonal CDMA using 24 cyclic shifts becomes possible per SC-FDMA symbol and 72 channels (24×3) can be multiplexed at the maximum. With this structure, it is possible to increase the number of ACK/NACK channels to be multiplexed.

Embodiment 1

In the embodiment 1, description is made about a first RS multiplexing method. The first RS multiplexing method is such that when reference signals are mapped to radio resources of plural layers corresponding to plural antennas and transmitted, the reference signals to be mapped to the radio resources of the respective layers are subjected to oversampling processing and at least some of the reference signals to be mapped to different layers are mapped to resource elements of the same time and frequency domains in such a manner that they are separated from each other in the frequency direction.

That is, in the first RS multiplexing method, reference signals to be mapped to different layers are subjected to frequency division multiplexing in a resource element (resource element of the same frequency and time domains). And, data signals are mapped in such a manner as to prevent the reference signal arranged in each layer from interfering with the data signal. When the N-times oversampling processing is performed on reference signals (when the oversampling factor is N), it is possible to map reference signals for N layers in the same resource elements.

With this first RS multiplexing method, it is possible to reduce the area of a reference signal mapped to each layer by a factor of N (one-Nth of the area), and therefore, it becomes possible to suppress any increase in overhead caused by insertion of reference signals and to prevent reduction in transmission efficiency.

Figure 4:
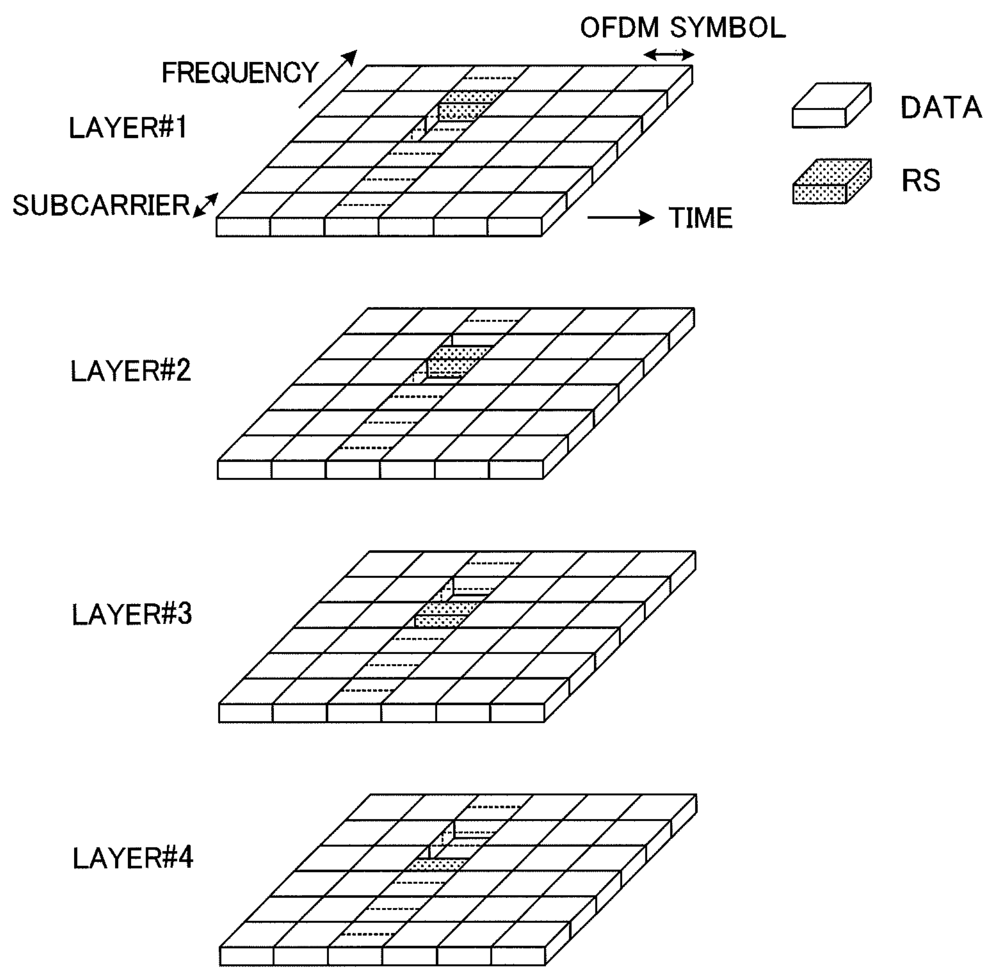
FIG. 4 is a diagram illustrating an example of a mapping method of reference signals according to an embodiment 1.

FIG. 4 illustrates one example of the first RS multiplexing method, in which the number of layers is 4 and reference signals are subjected to 2-times oversampling processing and mapped to the respective layers. In FIG. 4, oversampled reference signals are subjected to frequency division multiplexing (FDM). Here, the layers do not correspond one-to-one with the transmission antennas. The signals can be transmitted from all the transmission antennas with use of mutually different transmission phase/amplitude controls (precoding).

In FIG. 4, a reference signal (RS #1) to be transmitted in a layer #1 is arranged in an upper ½ subcarrier area of a resource element corresponding the second subcarrier from the top and the third OFDM symbol from the left. That is, the RS #1 is not arranged in the whole area of one resource element but in a ½ subcarrier area. Here, when the oversampling factor is N, the reference signal may be arranged in a 1/N subcarrier area. And, in the other subcarriers of the layer #1, data signals are mapped in such a manner as to prevent the data signals from interfering with reference signals transmitted in the other layers.

Second, a reference signal (RS #2) to be transmitted in a layer #2 is arranged in a lower ½ subcarrier area of the resource element corresponding the second subcarrier from the top and the third OFDM symbol from the left. That is, the RS #2 to be transmitted in the layer #2 and the RS #1 to be transmitted in the layer #1 are mapped to different areas of subcarrier in resource elements of the same time and frequency domains and are subjected to frequency division multiplexing. And, in the other subcarriers of the layer #2, data signals are mapped in such a manner as to prevent the data signals from interfering with the reference signals to be transmitted in the other layers.

Further, a reference signal (RS #3) to be transmitted in a layer #3 is arranged in an upper ½ subcarrier area of a resource element corresponding the third subcarrier from the top and the third OFDM symbol from the left. That is, the RS #3 is not arranged in the whole area in one resource element but in the ½ subcarrier area. And, in the other subcarriers of the layer #3, data signals are mapped in such a manner as to prevent the data signals from interfering with the reference signals to be transmitted in the other layers.

Furthermore, a reference signal (RS #4) to be transmitted in a layer #4 is arranged in a lower ½ subcarrier area of the resource element corresponding the third subcarrier from the top and the third OFDM symbol from the left. That is, the RS #4 to be transmitted in the layer #4 and the RS #3 to be transmitted in the layer #3 are mapped to different areas of subcarrier in resource elements of the same time and frequency domains and are subjected to frequency division multiplexing. And, in the other subcarriers of the layer #4, data signals are mapped in such a manner as to prevent the data signals from interfering with the reference signals to be transmitted in the other layers.

In this way, the reference signals to be mapped to the respective layers are subjected to the oversampling processing and the reference signals mapped to the different layers are subjected to the frequency division multiplexing in the same resource elements (resource elements of the same frequency and time domains). With this structure, it is possible to reduce the area of a reference signal to be mapped to each layer and suppress any increase in overhead caused by insertion of reference signals.

Here, in the radio communication method using the first RS multiplexing method illustrated in the embodiment 1, the oversampling processing may be performed on the reference signals in a selective manner. For example, when the data amount is small, the reference signals are mapped to the layers without being subjected to the oversampling processing. When the data amount exceeds a predetermined amount or when the number of antennas to be used in transmitting data is a predetermined number or more, the reference signals are subjected to the oversampling processing and mapped to the layers. And, mapping of the reference signals may be performed by changing the oversampling factor in accordance with the data amount or the number of antennas to be used in data transmission. Information relating to application of oversampling may be communicated by RRC signaling or the like. In this case, it can be switched dynamically whether or not to apply the oversampling processing to the reference signals.

Next description is made about configurations of a mobile terminal apparatus and a radio base station apparatus to which the first RS multiplexing method is applied. In this description, it is assumed that the radio base station apparatus and the mobile terminal apparatus have a plurality of transmission antennas compatible with the LTE-A system.

Figure 5:
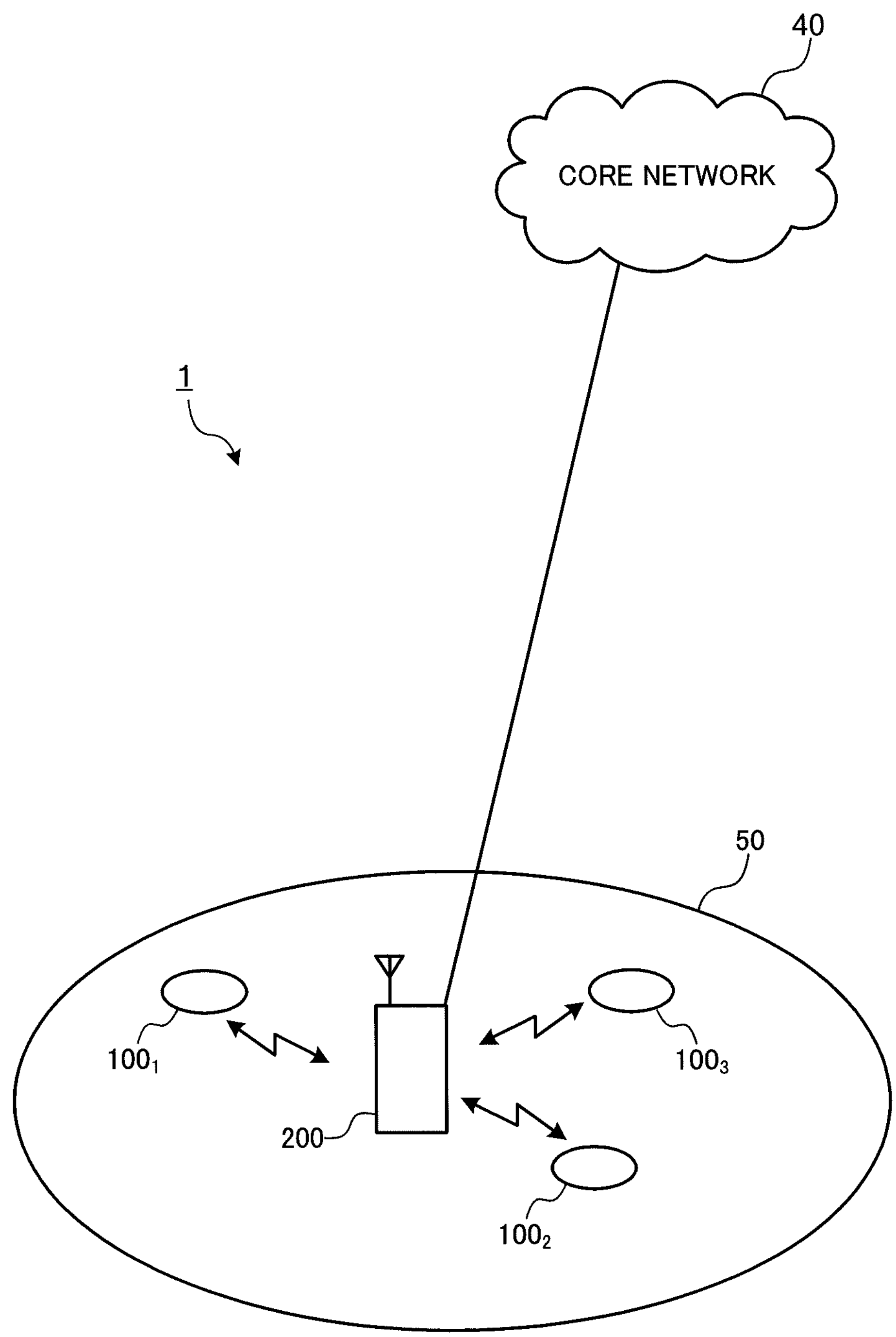
FIG. 5 is a diagram for explaining a configuration of a mobile communication system having a radio base station apparatus and mobile terminal apparatuses according to the embodiment 1.

First description is made, with reference to FIG. 5, about a mobile communication system 1 having mobile terminal apparatuses 100 and a radio base station apparatus 200. FIG. 5 is a diagram for explaining the configuration of the mobile communication system 1 having the radio base station apparatus 200 and the mobile terminal apparatuses 100 according to one embodiment of the present invention. The mobile communication system 1 illustrated in FIG. 5 is, for example, a system including an LTE system. And, this mobile communication system 1 may be called IMT-Advanced or 4G.

As illustrated in FIG. 5, the mobile communication system 1 has the ratio base station apparatus 200 and a plurality of mobile terminal apparatuses 100 ($100_1$, $100_2$, $100_3$, . . . , $100_n$, n is an integer greater than 0) which communicate with the radio base station apparatus 200. The radio base station apparatus 200 is connected to a core network 40. Each mobile terminal apparatus 100 communicates with the radio base station apparatus 200 in the cell 50. For example, the core network 40 include, but is not limited to, an access gateway device, a ratio network controller (RNC), a mobility management entity (MME) and the like.

As to the radio access system in the mobile communication system 1, the OFDMA is applied to the downlink and the SC-FDMA is applied to the uplink.

The OFDMA is a multicarrier transmission system in which communication is performed by dividing a frequency band into a plurality of narrow frequency bands (subcarriers) and mapping data to each of the subcarriers. The SC-FDMA is a single carrier transmission system in which communication is performed by mapping data in continuous bands per terminal, and multi access is realize by making a plurality of terminals use mutually different bands.

Here, description is made about a communication channel in the LTE system. In the downlink, there are used a PDSCH for transmitting traffic data of each mobile terminal apparatus 100, a PDCCH (Physical Downlink Control Channel) for communicating RB allocation information in the PDSCH, L1/L2 control information such as retransmission related information, data modulation scheme and channel coding rate and the like to the mobile terminal apparatus. And, a reference signal used in channel estimation, reception quality measurement and the like is transmitted with these channels.

As to the uplink, there are used a PUSCH (Physical Uplink Shared Channel) for transmitting traffic data of each mobile terminal apparatus 100, a PUCCH for transmitting a channel quality information (CQI: Channel Quality Indicator) report for downlink frequency scheduling, L1/L2 control information such as ACK/NACk and the like for the downlink transmission data. And, a reference signal for channel quality measurement used in channel quality measurement and a reference signal for demodulation used in channel estimation are transmitted with these channels.

Figure 6:
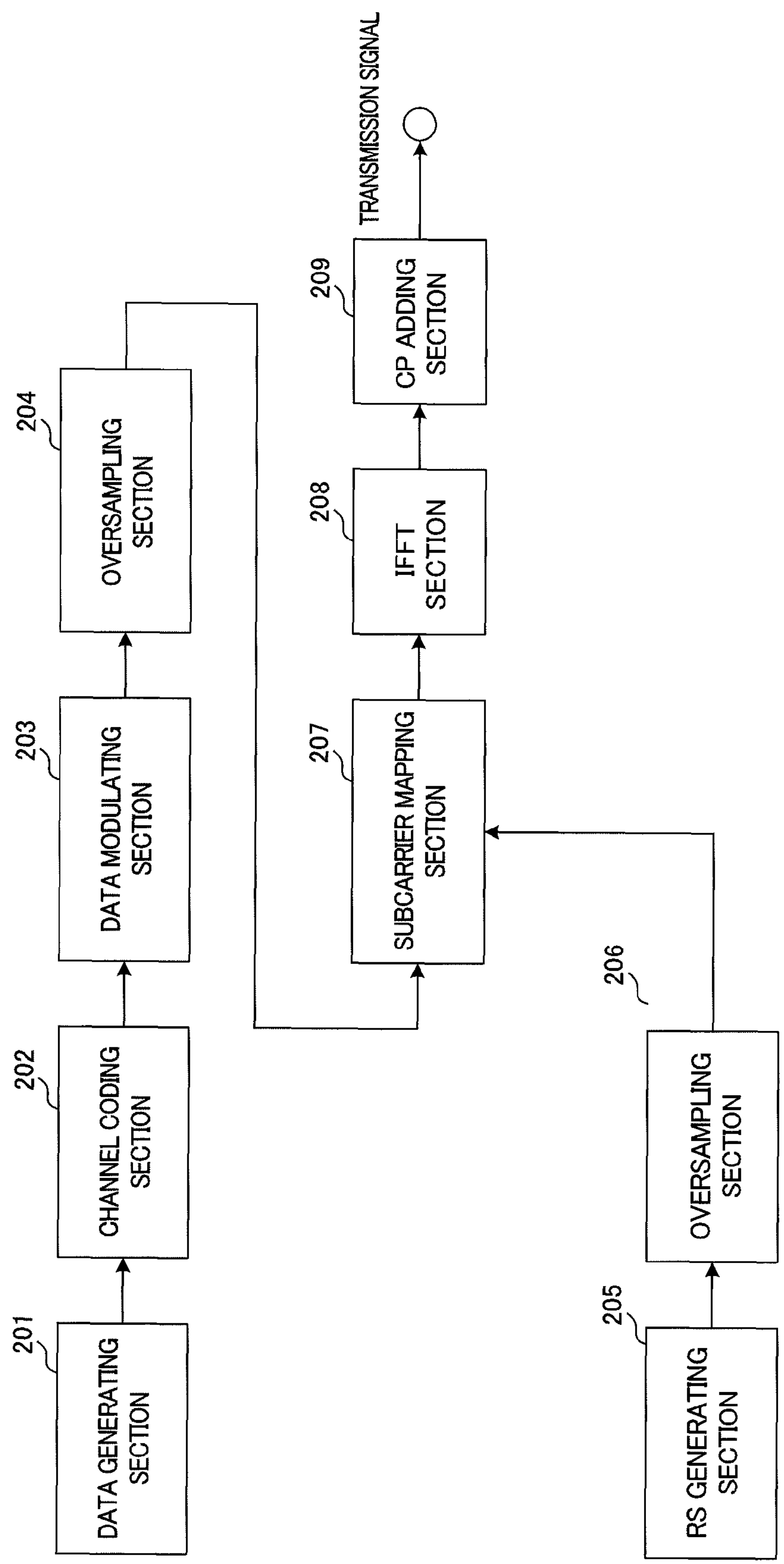
FIG. 6 illustrates an example of a functional block diagram of a transmitter performing radio communications by application of the mapping method of reference signal according to the embodiment 1.

Next description is made, with reference to FIG. 6, about a functional configuration of a transmitter which performs radio communications by application of the first RS multiplexing method. FIG. 6 illustrates an example of a functional block diagram of the transmitter performing radio communications with the application of the first RS multiplexing method. In the following description, the transmitter is applicable to the ratio base station apparatus in the downlink and the mobile terminal apparatus in the uplink, and the receiver is applicable to the mobile terminal apparatus in the downlink link and the radio base station apparatus in the uplink.

The transmitter has a data generating section 201 for generating data signals, a channel coding section 202 for performing error correction coding on data sequences to be transmitted, a data modulating section 203 for data-modulating the data signals which has been subjected to coding, an oversampling section 204 for performing oversampling processing on the data signals which have been subjected to data modulation, an RS generating section 205 for generating reference signals, an oversampling section 206 for performing oversampling on the generated reference signals, a subcarrier mapping section 207 for mapping the oversampled reference signals and data signals to subcarriers, an IFFT section 208 for performing IFFT (Inverse Fast Fourier Transform) on the mapped signals, and a CP adding section 209 for adding CPs (Cyclic Prefix) to the signals having being subjected to IFFT.

The channel coding section 202 performs error correction coding on data sequences to be transmitted, with use of a channel coding rate corresponding to MCS (Modulation and Coding Scheme) information. The channel coding section 202 outputs the data signals, which have been subjected to error correction coding, to the data modulating section 203.

The data modulating section 203 performs data modulation on the data signals by the data modulating scheme corresponding to the MCS information. The data modulating section 203 outputs the data signals, having been subjected to data modulation, to the oversampling section 204.

The RS generating section 205 generates reference signals for respective layers and outputs the reference signals to the oversampling section 206.

The oversampling sections 204 and 206 perform re-sampling with a higher frequency on the signals which have been subjected to sampling with a predetermined frequency. For example, they perform re-sampling at a subcarrier spacing of 7.5 kHz on the signals which have been subjected to sampling at a subcarrier spacing of 15 kHz, and the subcarrier spacing of re-sampling is twice as high. Here, as to the oversampling factor (how many times the frequency of the re-sampling is higher), it may be set as appropriate. And, the oversampling processing is applied only to OFDM symbols which are subjected to multiplexing of reference signals of the present invention (see FIG. 4).

The subcarrier mapping section 207 maps the oversampled reference signals and data signals to subcarriers of the respective layers based on resource mapping information. Specifically, as illustrated in FIG. 4 described above, the oversampled reference signals are mapped to the respective layers in such a manner that they are subjected to frequency division multiplexing at the same subcarrier. When the oversampling factor is N, mapping is performed in such a manner that N reference signals are subjected to frequency division multiplexing in resource elements of the same subcarrier. As mapping is thus performed, it is possible to reduce the area of reference signals to be mapped to the respective layers and suppress any increase in overhead due to insertion of the reference signals. Here, it is preferable that data signals are mapped so as not to interfere with the reference signals arranged in the respective layers.

The IFFT section 208 performs IFFT on subcarrier-mapped signals and converts the signals to time domain signals. The IFFT section 208 outputs the signals, having been subjected to IFFT, to the CP adding section 209. The CP adding section 209 adds CPs to the signals having been subjected to IFFT. The signals to which CPs are added by the CP adding section 209 are transmitted to the receiver as transmission signals.

Figure 7:
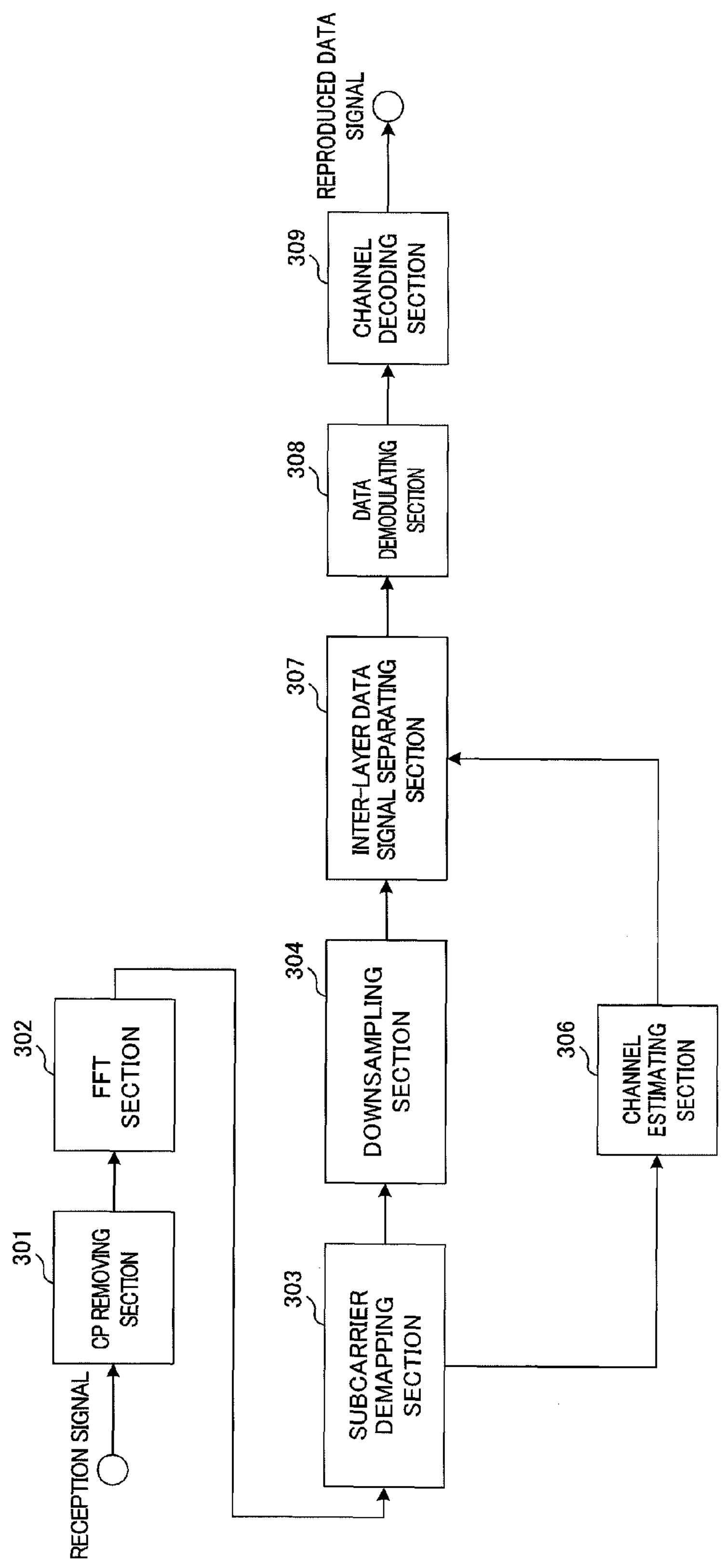
FIG. 7 illustrates an example of functional block diagram of a receiver performing radio communications by application of the mapping method of reference signal according to the embodiment 1.

Next description is made, with reference to FIG. 7, about a functional configuration of the receiver which performs radio communications with the application of the first RS multiplexing method. FIG. 7 illustrates an example of a functional block diagram of the receiver which performs radio communications with the application of the first RS multiplexing method.

The receiver has a CP removing section 301 for removing CPs from the reception signals, an FFT section 302 for performing FFT on the CP-removed reception signals and converts them to frequency domain signals, a subcarrier demapping section 303 for demapping the signals having been subjected to FFT, a downsampling section 304 for performing downsampling processing on subcarrier-demapped data signals, a channel estimating section 306 for estimating channel variances using the reference signals, an inter-layer data signal separating section 307 for separating the data signals on a per-layer basis, a data demodulating section 308 for demodulating the data signals having been separated on a per-layer basis and a channel decoding section 309 for performing channel decoding on data-demodulated signals.

The subcarrier demapping section 303 extracts data signals and reference signals from frequency domain signals with use of the resource mapping information.

The processing of the downsampling section 304 is applied only to OFDM symbols which are subjected to multiplexing of reference signals of the present invention. Signals having been subjected to sampling at a predetermined frequency are returned to be signals for sampling which is applied to other OFDM symbols. Specifically, signals oversampled at a predetermined multiple at the transmitter side are downsampled at a predetermined multiple. For example, if signals having been sampled at a subcarrier spacing of 15 kHz are subjected to oversampling at a subcarrier spacing of 7.5 kHz twice as high at the transmitter side, sampling may be performed at a subcarrier spacing of 15 kHz. Or, downsampling may be performed by coherent averaging of oversampled signals (converting two subcarriers at a subcarrier spacing of 7.5 kHz to one subcarrier at a subcarrier spacing of 15 kHz).

The channel estimating section 306 performs channel estimation using reference signals which have been subjected to oversampling at a predetermined multiple at the transmitter side (for example, reference signals having been subjected to sapling at a subcarrier spacing of 7.5 kHz at the transmitter side are subjected to signal processing still at a subcarrier spacing of 7.5 kHz at the receiver side).

The inter-layer data signal separating section 307 separates data signals between layers based on information channel-estimated by the channel estimating section 306. The inter-layer data signal separating section 307 outputs separated data signals to the data demodulating section 308.

The data demodulating section 308 demodulates the data signals output from the inter-layer data signal separating section 307 and outputs them to the channel decoding section 309.

Here, as FIGS. 6 and 7 described above are block diagrams of the transmitter and the receiver for the downlink OFDMA, however application of the first RS multiplexing method of the present invention is not limited to this. The following description is made, with reference to FIG. 16, about functional configurations of the transmitter and the receiver in radio communications in which the first RS multiplexing method is applied to the uplink SC-FDMA.

As illustrated in FIG. 16A, the transmitter has a data generating section 401 for generating data signals, a channel coding section 402 for performing error correction coding on data sequences to be transmitted, a data modulating section 403 for data modulating the coded data signals, a DFT section 404 for performing DFT (Discrete Fourier Transform) on data-modulated signals, a subcarrier mapping section 405 for mapping the transformed data signals to subcarriers, an IFFT section 406 for performing inverse fast Fourier transform on the mapped signals, and a CP adding section 407 for adding Cyclic Prefixes (CPs) to the signals having been subjected to IFFT. And, the transmitter has an RS generating section 409 for generating reference signals, an oversampling section 410 for performing oversampling processing on generated reference signals, a subcarrier mapping section 411 for mapping the oversampled reference signals to subcarriers, an IFFT section 412 for performing inverse fast Fourier transform on the mapped signals, and a CP adding section 413 for adding Cyclic Prefixes (CPs) to the transformed signals. It further has a time multiplexing section 408 for performing time division multiplexing on the reference signals and data signals. And, though it is not illustrated, the data signals and reference signals may be multiplexed between users by cyclic shift and block spreading.

As illustrated in FIG. 16B, the receiver has a time separating section 501 for separating time-separating reference signals and data signals from reception signals, CP removing sections 502 and 509 for removing CPs from separated data signals and reference signals, FFT sections 503, 510 for performing FFT on the CP-removed reception signals and reference signals and converting the signals into frequency domain signals, subcarrier demapping sections 504, 511 for demapping the transformed signals, a channel estimating section 512 for estimating channel variances using the demapped reference signals, a frequency domain equalizing section 505 for cancelling the effect of channel variances between the transmitter and the receiver, an IDFT section 506 for performing IDFT (Inverse Discrete Fourier Transform), a data demodulating section 507 for demodulating the transformed data signals, and a channel decoding section 508 for channel-decoding the data-demodulated signals.

As described above, for example, the physical uplink control channel (PUCCH) is used to transmit reception channel quality information (CQI: Channel Quality Indicator) measured by the UE and ACK/NACK (ACKnowledgement/Negative ACKnowledgement) of the PDSCH. The subframe is configured to include 7 SC-FDMA symbols in a slot (½ subframe), and in order to suppress increase of peak power, data signals and reference signals are subjected to time division multiplexing. And, the above-mentioned reception channel quality information (CQI) measured by the UE and the ACK/NACK of the PDSCH are both transmitted in 12-subcarrier band (see FIGS. 17A and 17B). Specifically, the subframe structure varies depending on whether the CQI or ACK/NACK is transmitted, and the subframe structure of the ACK/NACK (ACK/NACK format) is such that RSs are multiplexed in the third to five symbols (#3 to #5) in a slot and control information (ACK/NACK) is multiplexed in other symbols (the first symbol (#1), the second symbol (#2), the sixth symbol (#6), the seventh symbol (#7)), as illustrated in FIG. 17A. This slot is repeated twice in a subframe. And, the PUCCH is multiplexed to radio resources at each end of the system band and frequency hopping (inter-slot FH) is applied between two slots having different frequency bands in one subframe.

With the application of the first RS multiplexing method of the present invention to the uplink SC-FDMA, it is possible to double the number of subcarriers to which the reference signals can be mapped, as compared with the case where the oversampling processing is not performed (if the oversampling factor is 2). Accordingly, as RSs having a sequence length of 12 are mapped to every other subcarrier in the frequency direction in such a manner as to prevent interference between users (see FIG. 17D), it is possible to perform orthogonal multiplexing between users by FDMA. Besides, the RSs having a sequence length of 12 enables multiplexing of 12 users at the maximum by cyclic shift. Therefore, using the FDMA and cyclic shift multiplexing together, 24 user signals can be multiplexed within one SC-FDMA symbol.

Next description is made about a radio communication method using an RS multiplexing method that is different from that in the above-mentioned embodiment 1. The following description is made principally about differences from the embodiment 1, and detailed description of like parts are omitted here.

Embodiment 2

In the embodiment 2, a radio communication method using a second RS multiplexing method is described. The second RS multiplexing method is such that when transmitting signals having reference signals from a transmitter with a plurality of antennas, the reference signals to be mapped to radio resources of respective layers are subjected to oversampling processing and reference signals to be mapped to different layers are subjected to cyclic shift multiplexing.

And, in the second RS multiplexing method, when N-times oversampling is performed on reference signals, N reference signals may be mapped to same resource elements (resource elements of the same time and frequency domains) of respective layers. Besides, cyclic-shift-multiplexed layers may be subjected to frequency division multiplexing with other layers.

With the second RS multiplexing method, as it is possible to map the reference signals, which are to be mapped to respective layers, to resource elements of the same frequency and time domains, it is possible to suppress any increase in overhead due to insertion of reference signals and prevent reduction in transmission efficiency. The following is concrete description about the second RS multiplexing method.

Figure 8:
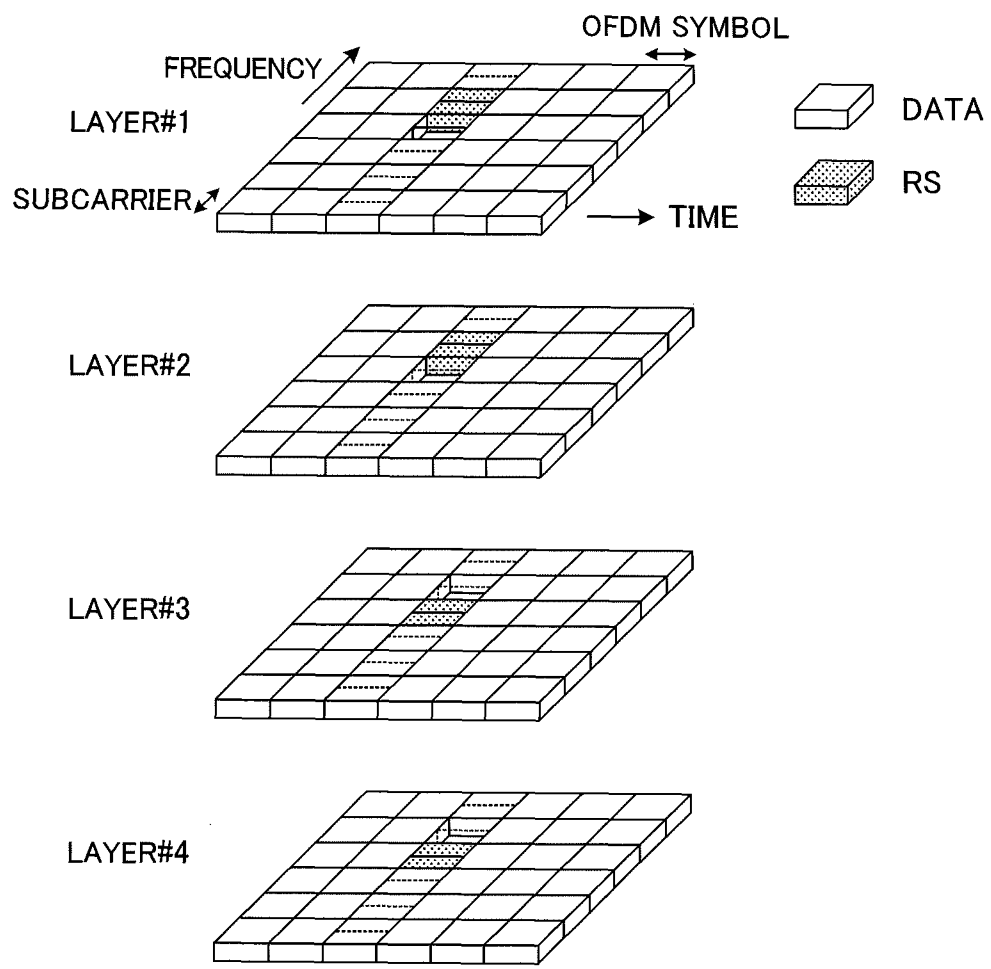
FIG. 8 is a diagram illustrating an example of a mapping method of reference signals according to an embodiment 2.

As one example of the second RS multiplexing method, FIG. 8 illustrates the number of layers is 4 and reference signals having been subjected to 2-times oversampling are mapped to the respective layers. FIG. 8 illustrates the oversampled reference signals are subjected to cyclic shift multiplexing.

In FIG. 8, two reference signals (RS #1) to be transmitted in the layer #1 are arranged in a resource element corresponding to the second subcarrier from the top and the third OFDM symbol from the left. And, in the other subcarriers in the layer #1, data signals are mapped in such a manner as to be prevented from interfering with reference signals to be transmitted in the other layers.

And, two reference signals (RS #2) to be transmitted in the layer #2 are arranged in a resource element corresponding to the second subcarrier from the top and the third OFDM symbol from the left. That is, plural reference signals RSs #1 to be transmitted in the layer #1 and plural reference signals RSs #2 to be transmitted in the layer #2 are mapped to resource elements of the same time and frequency domains and are subjected to cyclic shift multiplexing. And, in the other subcarriers in the layer #2, data signals are mapped in such a manner as to be prevented from interfering with reference signals to be transmitted in the other layers.

And, two reference signals (RS #3) to be transmitted in the layer #3 are arranged in a resource element, corresponding to the third subcarrier from the top and the third OFDM symbol from the left. And, in the other subcarriers in the layer #3, data signals are mapped in such a manner as to be prevented from interfering with reference signals to be transmitted in the other layers.

And, two reference signals (RS #4) to be transmitted in the layer #4 are arranged in a resource element corresponding to the third subcarrier from the top and the third OFDM symbol from the left. That is, plural reference signals RSs #3 to be transmitted in the layer #3 and plural reference signals RSs #4 to be transmitted in the layer #4 are mapped to resource elements of the same time and frequency domains and are subjected to cyclic shift multiplexing. And, in the other subcarriers in the layer #4, data signals are mapped in such a manner as to be prevented from interfering with reference signals to be transmitted in the other layers.

In this way, as the reference signals to be mapped to respective layers are subjected to the oversampling processing and reference signals mapped to different layers are subjected to cyclic shift multiplexing in the same resource elements, it is possible to suppress any increase in overhead due to insertion of reference signals. Besides, as illustrated in FIG. 8, the reference signals in the layer #1 and the reference signals in the layer #2 are subjected to cyclic shift multiplexing, the reference signals in the layer #3 and the reference signals in the layer #4 are subjected to cyclic shift multiplexing, a layer group composed of the layers #1 and #2 and a layer group composed of the layer #3 and the layer #4 are subjected to frequency division multiplexing. With this structure, it is possible to reduce the number of layers to be subjected to cyclic shift multiplexing and accordingly, even when the number of layers is large, it becomes possible to reduce the number of layers to be subjected to cyclic shift multiplexing and to perform orthogonal multiplexing of reference signals between layers effectively.

The following description is made about configurations of the mobile terminal apparatus, the radio base station apparatus and the like to which the second RS multiplexing method is applied. Here, a mobile communication system having mobile terminal apparatuses and a radio base station apparatus, a functional configuration of the mobile terminal apparatus, and a functional configuration of the radio base station apparatus are the same as those in FIG. 5 described above, and their detailed explanations are omitted here.

Figure 9:
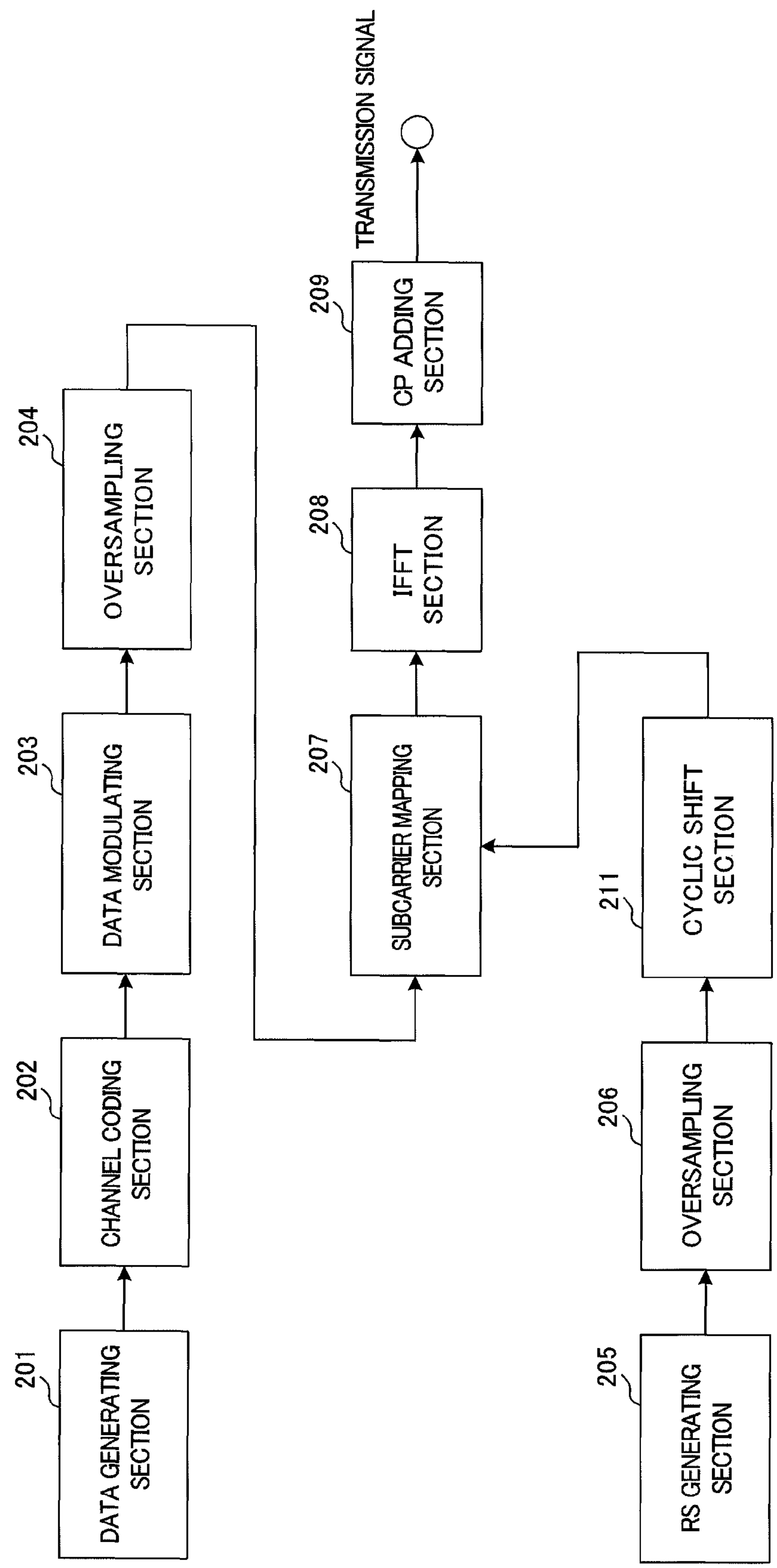
FIG. 9 is an example of a functional block diagram of a transmitter performing radio communications by application of the mapping method of reference signals according to the embodiment 2.

First description is made, with reference to FIG. 9, about the functional configuration of a transmitter for performing radio communications with application of the second RS multiplexing method. FIG. 9 is an example of a functional block diagram of the transmitter which performs radio communications with application of the second RS multiplexing method. In the following description, the transmitter is applicable to the radio base station apparatus in the downlink and to the mobile terminal apparatus in the uplink, and the receiver is applicable to the mobile terminal apparatus in the downlink and the radio base station apparatus in the uplink.

The transmitter has a data generator 201 for generating data signals, a channel coding section 202 for performing error correction coding on data sequences to be transmitted, a data modulating section 203 for data-modulating the coded data signals, an oversampling section 204 for performing the oversampling processing on the data-modulated data signals, an RS generating section 205 for generating reference signals, an oversampling section 206 for performing the oversampling section on the generated reference signals, a cyclic shift section 211 for applying cyclic shift to the oversampled reference signals, a subcarrier mapping section 207 for mapping the oversampled reference signals and data signals to subcarriers, an IFFT section 208 for performing IFFT (Inverse Fast Fourier Transform) on the mapped signals, and a CP adding section 209 for adding CPs (Cyclic Prefixes) to the signals having been subjected to IFFT. Here, the oversampling processing in the oversampling sections 204 and 206 is applied only to OFDM symbols where reference signals are multiplexed according to the present invention (see FIG. 8).

The cyclic shift section 211 performs cyclic shift on frequency domain signals by predetermined cyclic shift amount. Here, the cyclic shift amount varies on a per-layer basis and is associated with the cyclic shift number.

The transmission data generated by the data generating section 201 is subjected to error correction coding by the channel coding section 202, output to the data modulating section 203 and data-modulated. Then, the data is subjected to re-sampling at a higher frequency by the oversampling section 204. And, the reference signals generated by the RS generating section 205 are subjected to re-sampling at a higher frequency by the oversampling section 206 and output to the cyclic shift section 211, in which each signal is applied with cyclic shift. Then, the oversampled data signals and reference signals are mapped to subcarriers of respective layers based on the resource mapping information in the subcarrier mapping section 207 and output to the IFFT section 208, in which the signals are subjected to IFFT and converted into time domain signals. The signals having been subjected to IFFT are output to the CP adding section 209 and added with CPs, and then transmitted to the receiver as transmission signals. In this embodiment, the reference signals to be mapped to respective layers are subjected to the oversampling processing, and the reference signals mapped to different layers are subjected to cyclic shift multiplexing in same resource elements. With this structure, it is possible to suppress any increase in overheat due to insertion of reference signals.

Figure 10:
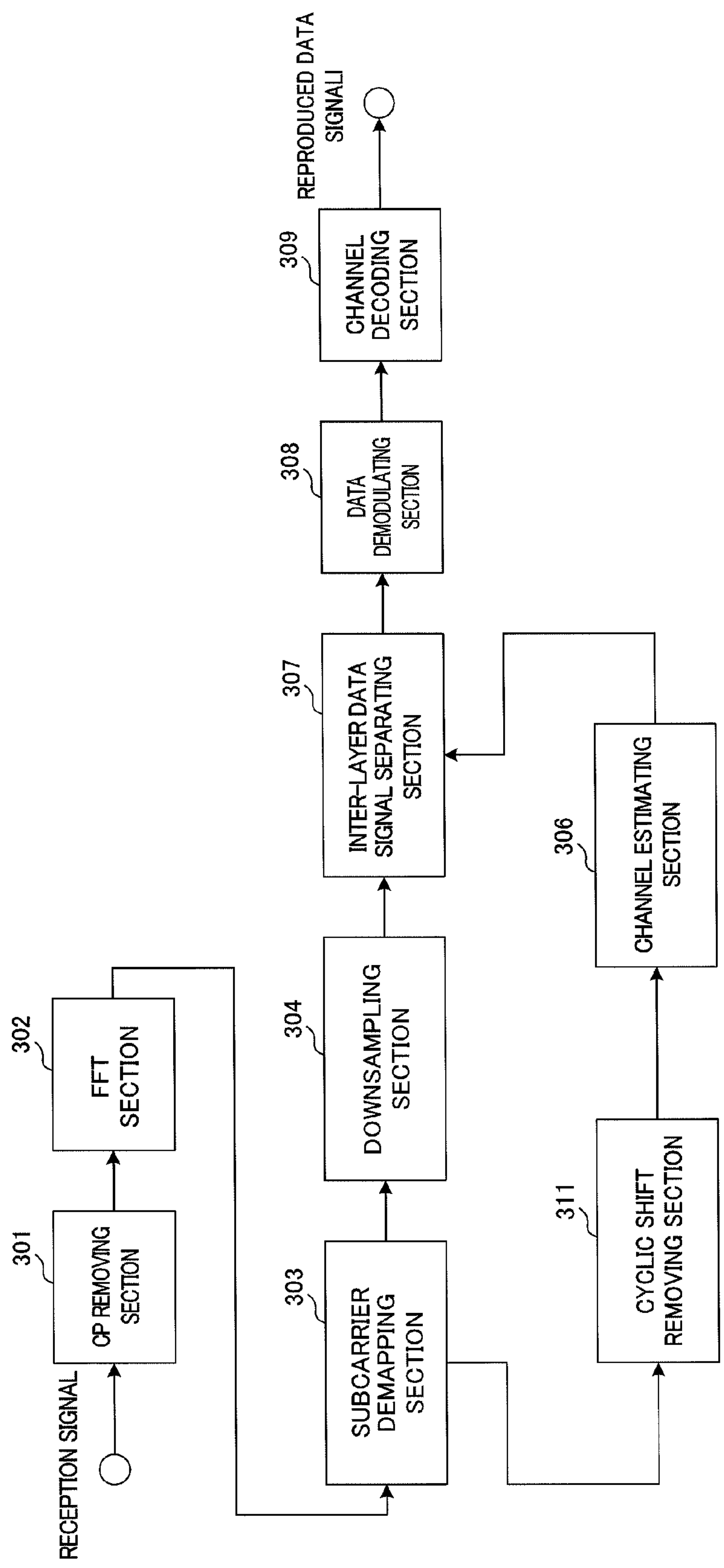
FIG. 10 is an example of a functional block diagram of a receiver performing radio communications by application of the mapping method of reference signals according to the embodiment 2.

Next description is made, with reference to FIG. 10, about a functional configuration of the receiver that performs radio communications with the application of the second RS multiplexing method. FIG. 10 illustrates an example of a functional block diagram of the receiver that performs radio communications with the application of the second RS multiplexing method.

The receiver has a CP removing section 301 for removing CPs from reception signals, an FFT section 302 for performing FFT on the CP-removed reception signals and converting the signals into frequency domain signals, a subcarrier demapping section 303 for demapping the signals having been subjected to FFT, a downsampling section 304 for performing downsampling processing on the subcarrier-demapped data signals, a cyclic shift removing section 311 for separating orthogonally-multiplexed reference signals, a channel estimating section 306 for estimating channel variances with use of the reference signals, an inter-layer data signal separating section 307 for separating the data signals on a per-layer basis, a data demodulating section 308 for demodulating the data signals separated on a per-layer basis, and a channel decoding section 309 for data-decoding the data-demodulated signals. Here, the processing by the downsampling section 304 is applied only to OFDM symbols where reference signals are multiplexed according to the present invention.

The cyclic shift removing section 311 separates control signals which have been orthogonally multiplexing with cyclic shift, with use of a cyclic shift number.

Figure 11:
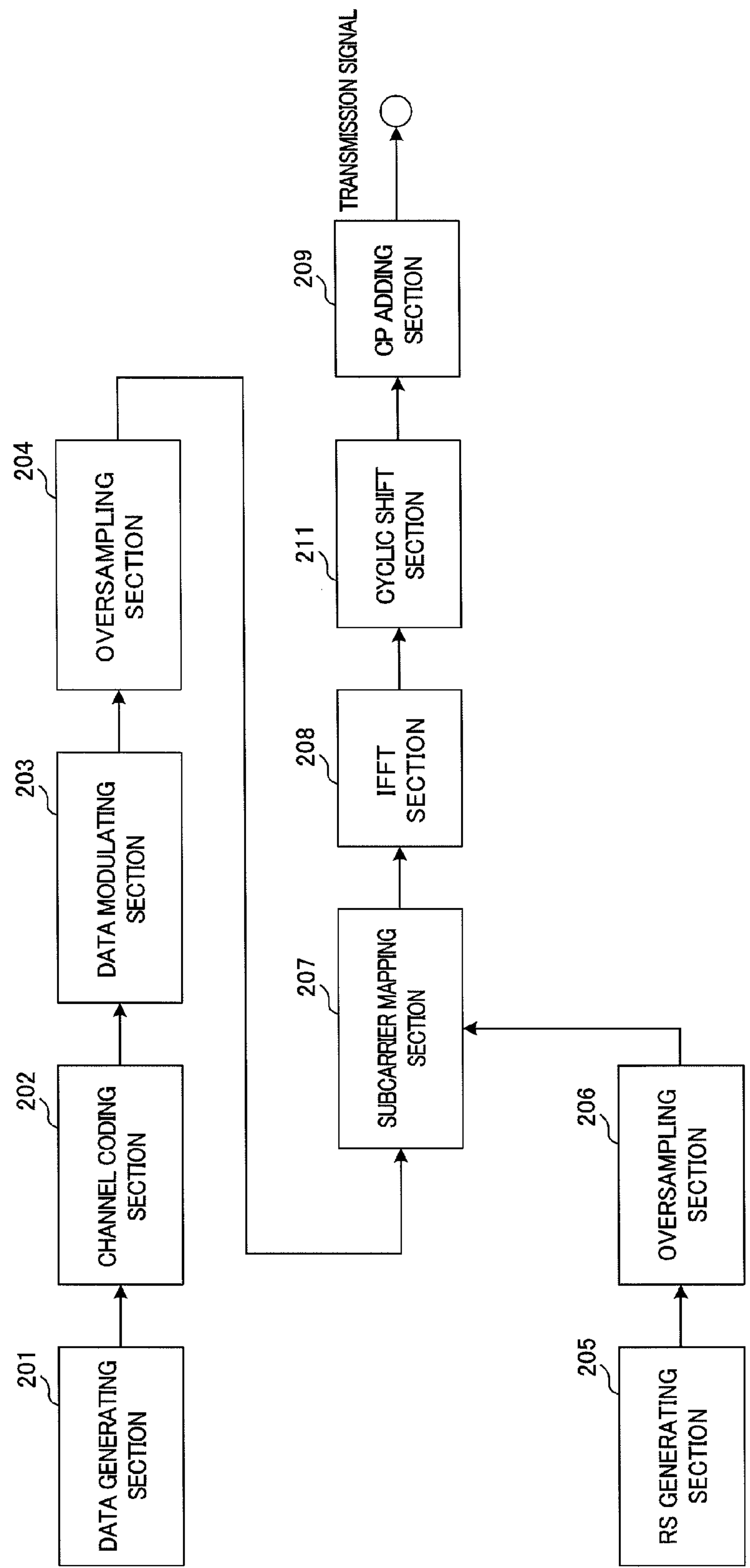
FIG. 11 is an example of a functional block diagram of a transmitter performing radio communications by application of the mapping method of reference signals according to the embodiment 2.
Figure 12:
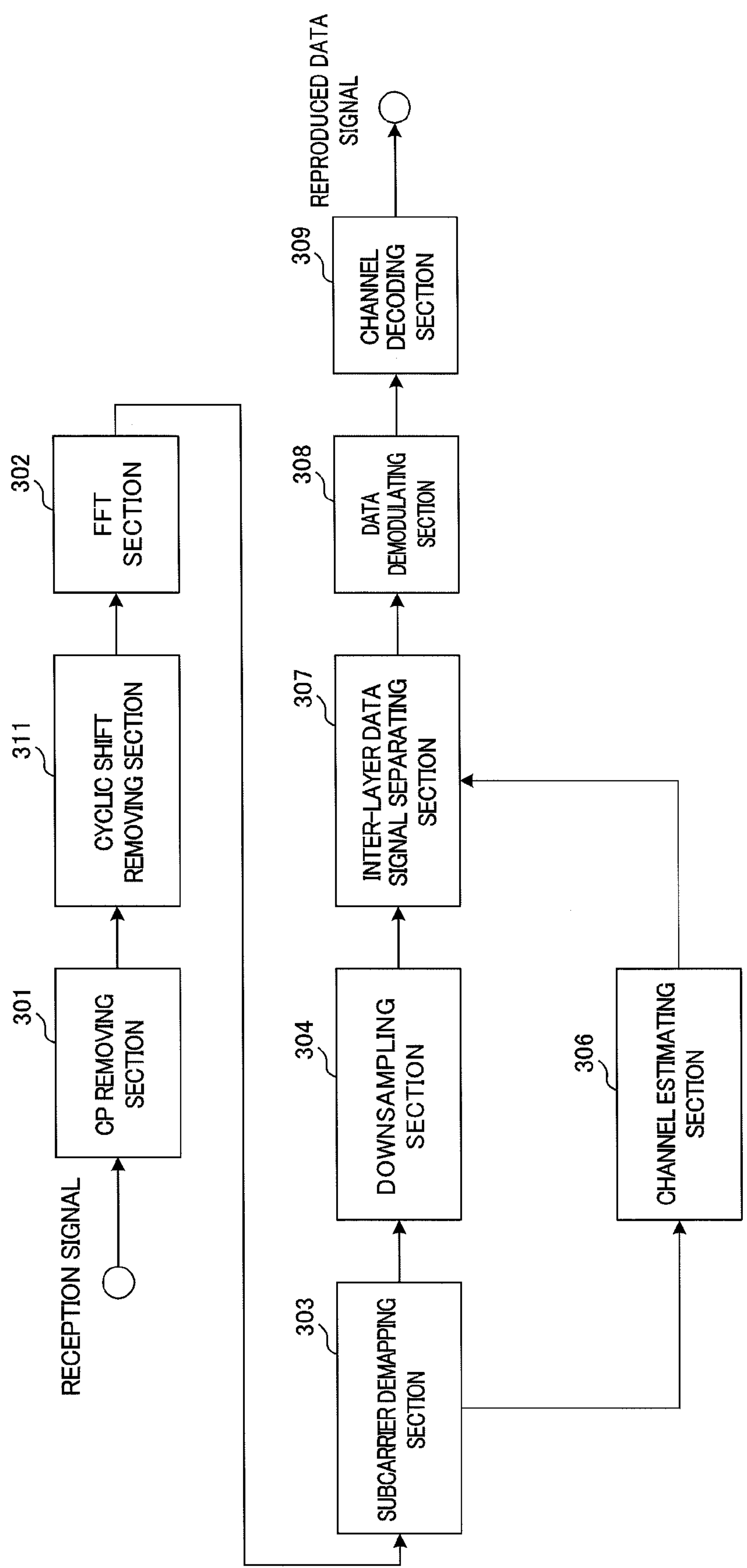
FIG. 12 is an example of a functional block diagram of a receiver performing radio communications by application of the mapping method of reference signals according to the embodiment 2.

In FIG. 9 described above, the cyclic shift section 211 is provided between the oversampling section 206 and the subcarrier mapping section 207 and frequency domain signals are cyclic-shifted by a predetermined cyclic shift amount. However, the cyclic shift may be added to the signals which are already converted into time domain signals. In such a case, the signals output from the IFFT section 208 may be input to the cyclic shift section 211 (see FIG. 11). With this structure, the cyclic shift is added to all the symbols including data signals and reference signals mapped to the resource elements of the respective layers. And, if the transmitter is configured as illustrated in FIG. 11, in the receiver, after CPs are removed from reception signals by the CP removing section 301, the cyclic shift is removed by the cyclic shift removing section 311 and then, the signals are subjected to FFT by the FFT section 302 and converted into frequency domain signals (see FIG. 12).

Here, FIGS. 9 to 12 described above are block diagrams of the transmitter and receiver regarding downlink OFDM, however, application of the second RS multiplexing method of the present invention is not limited to this. The following description is made, with reference to FIG. 18, about functional configurations of the transmitter and receiver in radio communications in which the second RS multiplexing method is applied to uplink SC-FDMA.

As illustrated in FIG. 18A, the transmitter has a data generating section 401 for generating data signals, a channel coding section 402 for performing error correction coding on data sequences to be transmitted, a data modulating section 403 for data modulating the coded data signals, a DFT section 404 for performing DFT (Discrete Fourier Transform) on the data-modulated signals, a subcarrier mapping section 405 for mapping the transformed data signals to subcarriers, an IFFT section 406 for performing IFFT (inverse Fast Fourier Transform) on the mapped signals, and a CP adding section 407 for adding CPs (Cyclic Prefixes) to the signals having been subjected to IFFT. And, the transmitter, has an RS generating section 409 for generating reference signals, an oversampling section 410 for performing the oversampling processing on the generated reference signals, a cyclic shift section 414 for adding cyclic shift to the oversampled reference signals, a subcarrier mapping section 411 for mapping the CP-added reference signals to subcarriers, an IFFT section 412 for performing IFFT (inverse fast Fourier transform) on the mapped signals, a CP adding section 413 for adding CPs (cyclic prefixes) to the signals having been subjected to IFFT, and a time multiplexing section 408 for performing time division multiplexing on the data signals and reference signals. Though it is not illustrated, the data signals and reference signals may be multiplexed between users by cyclic shift and block spreading.

As illustrated in FIG. 18B, the receiver has a time separating section 501 for time separating data signals and reference signals from reception signals, CP removing sections 502 and 509 for removing CPs from the separated data signals and reference signals, FFT sections 503 and 510 for performing FFT on the CP-removed reception signals and reference signals and converting the signals into frequency domain signals, subcarrier demapping sections 504 and 511 for demapping the signals having been subjected to FFT, a cyclic shift removing section 513 for separating the orthogonal-multiplexed reference signals, a channel estimating section 512 for estimating channel fluctuations with use of the CP-separated reference signals, a frequency domain equalizing section 505 for compensating effects of the channel fluctuations between the transmitter and receiver, an IDFT section 506 for performing IDFT (inverse Discrete Fourier transform), a data demodulating section 507 for demodulating the data signals having been subjected to IDFT and a channel decoding section 508 for channel decoding the data-demodulated signals.

As described above, for example, the PUCCH (physical uplink control channel) is used to transmit reception channel quality information (CQI: Channel Quality Indicator) measured by UE and ACK/NACK (ACKnowledgement/Negative ACKnowledgement) of the PDSCH. The subframe structure is such that the data signals and reference signals are subjected to time division multiplexing in order to suppress increase of peak power. And, the above-mentioned reception channel quality information measured by UE and ACK/NACK of the PDSCH are both transmitted in a 12-subcarrier band (see FIGS. 17A and 17B). With the application of the second RS multiplexing method of the present invention, it is possible to double the number of subcarriers to which reference signals can be mapped (if the oversampling factor is 2), as compared with the case where the oversampling processing is not performed (see FIG. 17C). That is, it is possible to map an RS sequence having a sequence length of 24 that is twice as long as a conventional one. With this structure, as the cyclic shift number is doubled, that is, 24 users can be multiplexed per SC-FDMA, it is possible to increase the number of users to be multiplexed.

Also in the radio communication method using the second RS multiplexing method illustrated in the embodiment 2, it is possible to perform the oversampling processing on reference signals in a selective manner, like in the radio communication method illustrated in the embodiment 1 described above.

Next description is made about a radio communication method using an RS multiplexing method which is different from the first and second RS multiplexing methods described above. The following description will be made principally about differences from the embodiments 1 and 2 and detailed description of like parts is omitted here.

Embodiment 3

In the embodiment 3, description is made about a radio communication method using a third RS multiplexing method. The third RS multiplexing method is such that when signals having reference signals are transmitted from a transmitter having a plurality of antennas, the reference signals to be mapped to radio resources of respective layers are subjected to the oversampling processing, the reference signals to be mapped to different layers are arranged in the subcarriers of the same time and frequency domains and subjected to code division multiplexing (CDM) with use of orthogonal codes.

With the third RS multiplexing method, as it is possible to reduce the area of reference signals to be mapped to the respective layers in the frequency direction, it is possible to suppress any increase in overhead due to insertion of reference signals and to prevent reduction in transmission efficiency.

Figure 13:
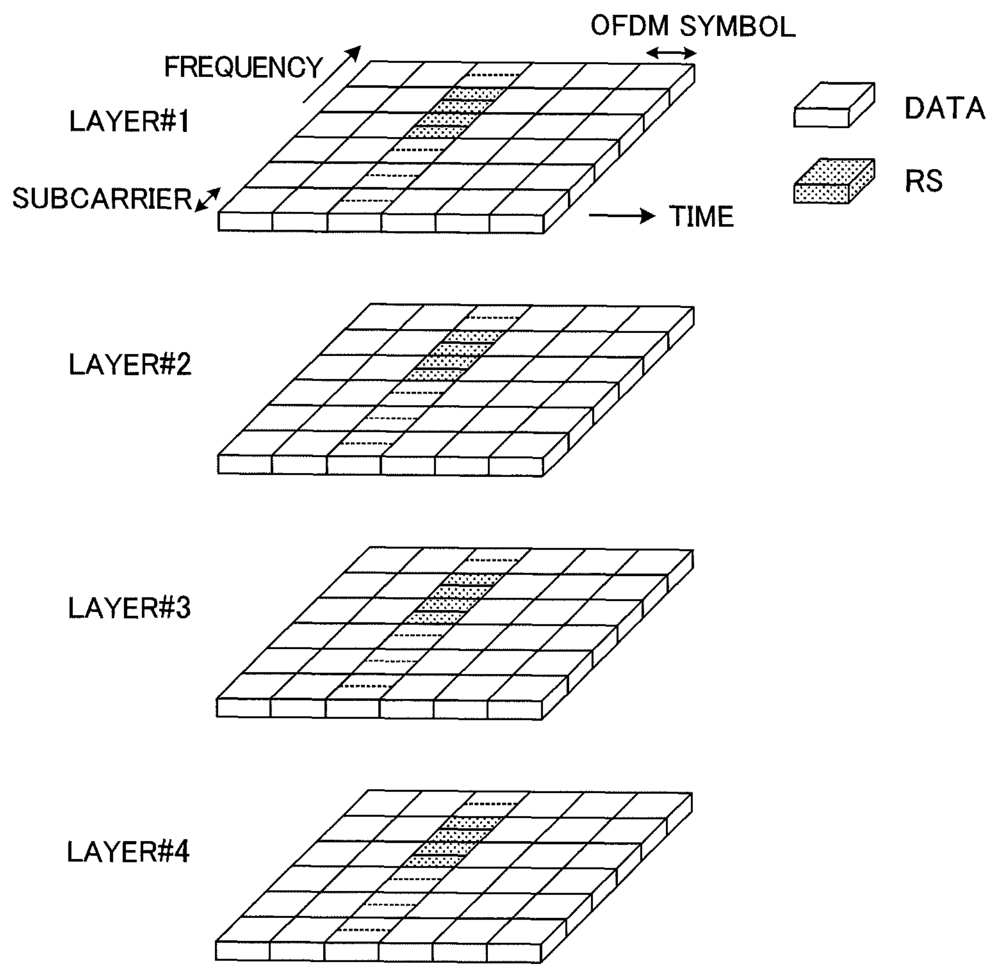
FIG. 13 is a diagram illustrating an example of the mapping method of reference signals according to an embodiment 3.

As one example of the third RS multiplexing method, FIG. 13 illustrates the reference signals are subjected to 2-times oversampling processing at the respective layers and mapped where the number of layers is 4. FIG. 13 is a view of code division multiplexing (CDM) performed on the oversampled reference signals. In CDM, plural reference signals are arranged in OFDM symbols of the same time and frequency domains and multiplexed between layers with use of orthogonal codes.

In FIG. 13, the reference signals to be transmitted in the layers #1 to #4 are arranged in resource elements corresponding to the second subcarrier from the top and the third OFDM symbol from the left and resource elements corresponding to the third subcarrier from the top and the third OFDM symbol from the left, and orthogonalized between layers with use of orthogonal codes. In these two resource element parts, as orthogonalization is performed with use of orthogonal codes, the reference signals are orthogonalized between transmission antennas. The orthogonal codes may be Walsh codes, DFT codes or the like.

Next description is made about configurations of a mobile terminal apparatus, a radio base station apparatus and the like to which the third RS multiplexing method is applied. Here, the mobile communication system having a radio base station apparatus and mobile terminal apparatuses and the functional configurations of the mobile terminal apparatus and the radio base station apparatus are same as those in FIG. 5 described above and their detailed explanations are omitted here.

Figure 14:
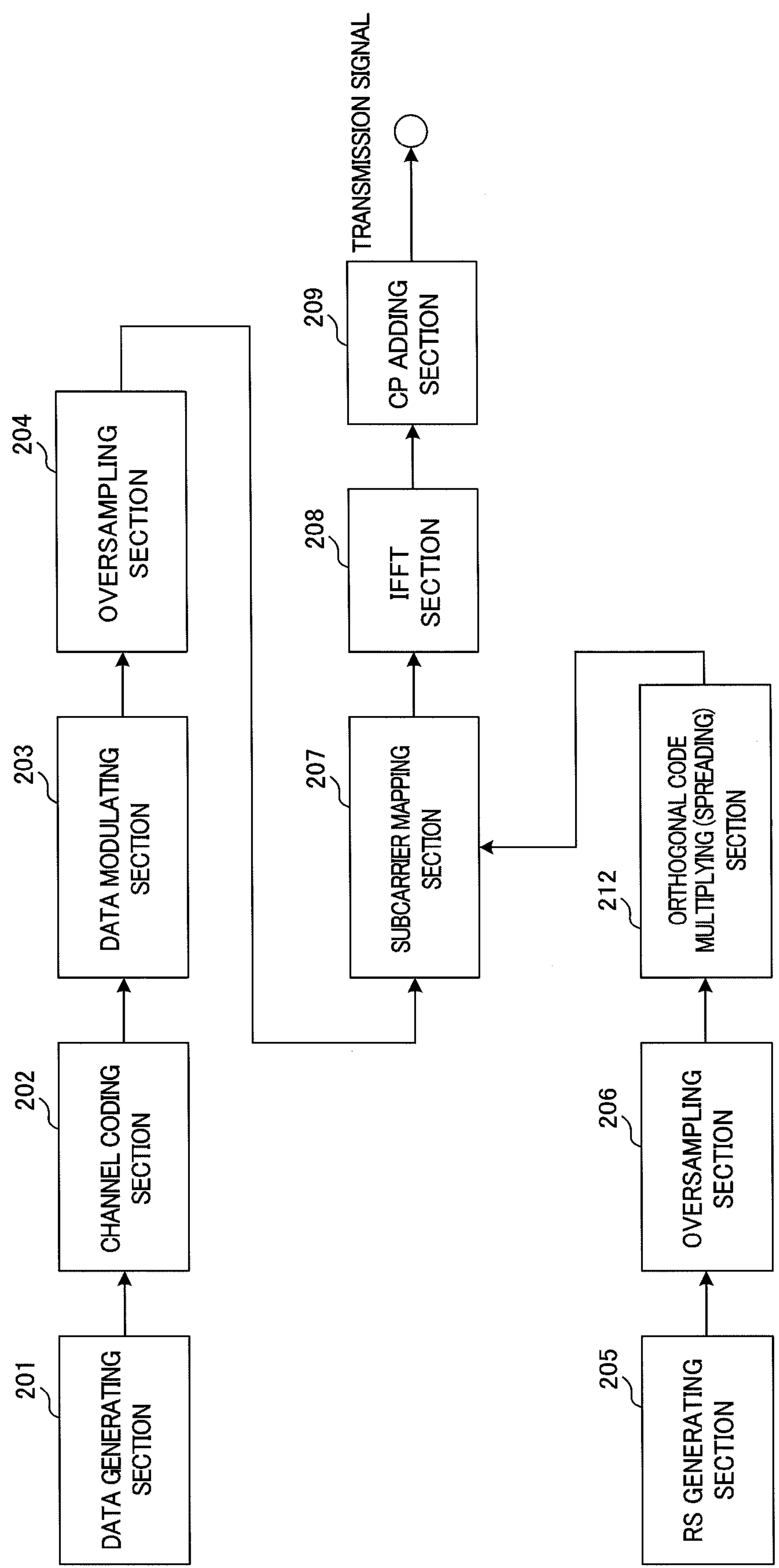
FIG. 14 is an example of a functional block diagram of a transmitter performing radio communications by application of the mapping method of reference signals according to the embodiment 3.

First, with reference to FIG. 14, the functional configuration of the transmitter performing radio communications by application of the third RS multiplexing method is described. FIG. 14 is an example of a functional block diagram of the transmitter performing radio communications by application of the third RS multiplexing method. Here, in the following description, the transmitter is applicable to a mobile terminal apparatus on the uplink or the radio base station apparatus on the downlink, and the receiver is applicable to the mobile terminal apparatus on the downlink or the radio base station apparatus on the uplink.

The transmitter has a data generating section 201 for generating data signals; a channel coding section 202 for performing error correction coding on data sequences to be transmitted, a data modulating section 203 for data-modulating the coded data signals, an oversampling section 204 for performing the oversampling processing on the data-modulated data signals, an RS generating section 205 for generating reference signals, an oversampling section 206 for performing the oversampling processing on the generated reference signals, an orthogonal code multiplying section 212 for orthogonally coding the oversampled reference signals, a subcarrier mapping section 207 for mapping the oversampled data signals and reference signals to subcarriers and an IFFT section 208 for performing inverse fast Fourier transform (IFFT) on the mapped signals and a CP adding section 209 for adding CPs (Cyclic Prefixes) to the signals having been subjected to IFFT.

The orthogonal code multiplying section 212 multiplies the oversampled reference signal by an orthogonal code. The orthogonal code used for the reference signal may be communicated from a higher layer by RRC signaling or the like.

The transmission data generated by the data generating section 201 is subjected to error correction coding by the channel coding section 202, and then output to the data modulating section 203 and subjected to data modulation. After that, it is subjected to re-sampling at a higher frequency by the oversampling section 204. The reference signals generated by the RS generating section 205 are subjected to re-sampling at a higher frequency by the oversampling section 206, output to the orthogonal code multiplying section 212 and subjected to orthogonal coding. Then, the oversampled data signals and reference signals are mapped to subcarriers of respective layers based on the resource mapping information by the subcarrier mapping section 207 and output to the IFFT section 208, in which the signals are subjected to IFFT and converted into time domain signals. The signals having been subjected to IFFT are output to the CP adding section, added with CPs and transmitted to the receiver as transmission signals. In this present embodiment, the reference signals to be mapped to respective layers are subjected to the oversampling processing and reference signals to be mapped to different layers are arranged in resource elements of the same time and frequency domains and multiplexed with orthogonal codes, thereby making it possible to reduce the area of reference signals mapped to the respective layers in the frequency direction. With this structure, it is possible to prevent any increase in overhead by insertion of the reference signal and prevent reduction of transmission efficiency.

Figure 15:
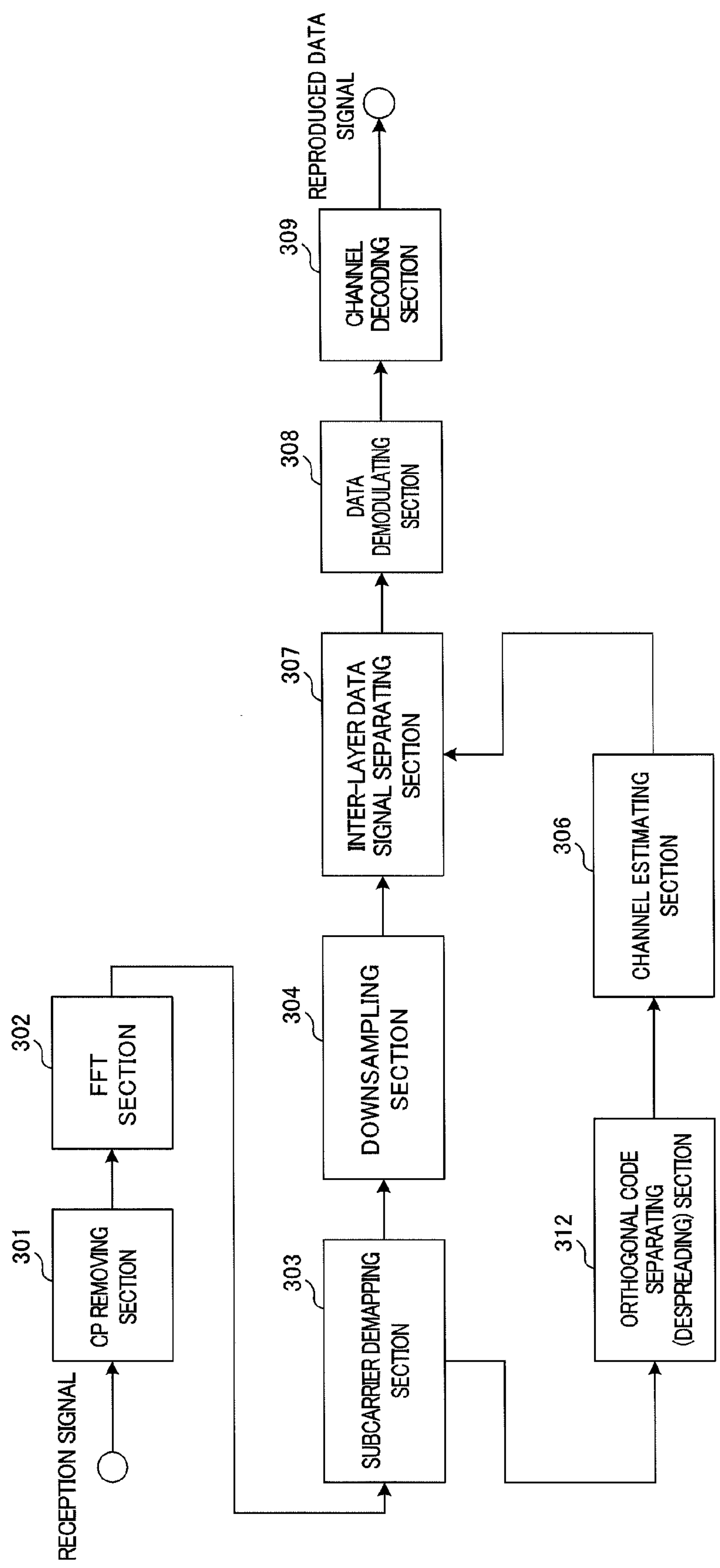
FIG. 15 is an example of a functional block diagram of a receiver performing radio communications by application of the mapping method of reference signals according to the embodiment 3.

Next description is made, with reference to FIG. 15, about a functional configuration of the receiver performing radio communications by application of the third RS multiplexing method. FIG. 15 is an example of a functional block diagram of the receiver performing radio communications by application of the third RS multiplexing method.

The receiver has a CP removing section 301 for removing CPs from reception signals, an FFT section 302 for performing FFT on the CP-removed reception signals and converting the signal into frequency domain signals, a subcarrier demapping section 303 for demapping the signals having been subjected to FFT, a downsampling section 304 for performing the downsampling processing on subcarrier-demapped data signals, an orthogonal code separating section 312 for separating orthogonally-coded reference signals, a channel estimating section 306 for estimating channel variances with use of the downsampled reference signals, an inter-layer data signal separating section 307 for separating data signals per layer, a data demodulating section 308 for demodulating the data signals separated per layer, and a channel decoding section 309 for data-decoding the data-demodulated signals.

Here, also in the radio communication method using the third RS multiplexing method illustrated in the embodiment 3, the oversampling processing may be performed on the reference signals in a selective manner like in radio communication methods described in the above-described embodiments 1 and 2.

The present invention is not limited to the above-described embodiments and may be embodied in various modified forms. In the above-described embodiments, the number of transmission antennas is merely an example and is not limiting. And, the number of processing sections, the processing procedures in the above description may be modified as appropriate and embodied without departing from the scope of the present invention. And, the elements illustrated in the drawings represent respective functions and each functional block may be embodied by hardware or software. Other modification may be also embodied as appropriate without departing from the scope of the present invention.

INDUSTRIAL APPLICABILITY

The present invention is useful for radio base station apparatuses, mobile terminal apparatuses and radio communication methods of the LTE-A system.

The disclosure of Japanese Patent Application No. 2010-179584, filed on Aug. 10, 2010, including the specification, drawings, and abstract, is incorporated herein by reference in its entirety.

The invention claimed is:

1. A radio communication method for mapping reference signals to radio resources of a plurality of layers and transmitting the reference signals, the radio communication method comprising the steps of:
- generating the reference signals;
- oversampling the reference signals;
- applying cyclic shifts to the reference signals oversampled; and
- mapping the reference signals applied with the cyclic shifts, to resource elements of the layers respectively,
- wherein a plurality of same reference signals are mapped along a frequency direction in each of resource elements of same time and frequency domains in respective layers and reference signals of the respective layers are cyclic shift multiplexed.

2. The radio communication method of claim 1, wherein when an oversampling factor is N, N reference signals are mapped along the frequency direction in each of the resource elements of same time and frequency domains in the respective layers.

3. The radio communication method of claim 1, wherein the plurality of layers comprises a layer group of some layers on which cyclic shift multiplexing is performed mutually and other layers, and frequency division multiplexing is performed between the layer group and the other layers.

4. A radio communication method for mapping reference signals to radio resources of a plurality of layers and transmitting the reference signals, the radio communication method comprising the steps of:
- generating the reference signals;
- oversampling the reference signals;
- mapping the reference signals oversampled, to resource elements of the layers respectively; and
- applying cyclic shifts to all symbols including data signals and the reference signals mapped to resource elements of the layers,
- wherein a plurality of same reference signals are mapped along a frequency direction in each of resource elements of same time and frequency domains in respective layers and reference signals of the respective layers are cyclic shift multiplexed.

5. The radio communication method of claim 4, wherein when an oversampling factor is N, N reference signals are mapped along the frequency direction in each of the resource elements of same time and frequency domains in the respective layers.

6. The radio communication method of claim 4, wherein the plurality of layers comprises a layer group of some layers on which cyclic shift multiplexing is performed mutually and other layers, and frequency division multiplexing is performed between the layer group and the other layers.

7. A transmitter for mapping reference signals to radio resources of a plurality of layers and transmitting the reference signals, the transmitter comprising:
- a reference signal generating section configured to generate the reference signals;
  - an oversampling section configured to perform oversampling on the reference signals;
- a cyclic shift section configured to apply cyclic shifts to the reference signals oversampled; and
- a subcarrier mapping section configured to map the reference signals applied with the cyclic shifts, to resource elements of the layers respectively,
- wherein a plurality of same reference signals are mapped along a frequency direction in each of resource elements of same time and frequency domains in respective layers and reference signals of the respective layers are cyclic shift multiplexed.

8. The transmitter of claim 7, wherein when the oversampling section perform N-times oversampling on the reference signals and the subcarrier mapping section maps N reference signals along the frequency direction in each of the resource elements of same time and frequency domains in the respective layers.

9. The transmitter of claim 7, wherein the plurality of layers comprises a layer group of some layers on which cyclic shift multiplexing is performed mutually and other layers, and frequency division multiplexing is performed between the layer group and the other layers.

10. A transmitter for mapping reference signals to radio resources of a plurality of layers and transmitting the reference signals, the transmitter comprising:
- a reference signal generating section configured to generate the reference signals;
  - an oversampling section configured to perform oversampling on the reference signals;
- a subcarrier mapping section configured to map the reference signals oversampled, to resource elements of the layers respectively; and
- a cyclic shift section configured to apply cyclic shifts to all symbols including data signals and the reference signals mapped to resource elements of the respective layers,
- wherein a plurality of same reference signals are mapped along a frequency direction in each of resource elements of same time and frequency domains in respective layers and reference signals of the respective layers are cyclic shift multiplexed.

11. The transmitter of claim 10, wherein when the oversampling section perform N-times oversampling on the reference signals and the subcarrier mapping section maps N reference signals along the frequency direction in each of the resource elements of same time and frequency domains in the respective layers.

12. The transmitter of claim 10, wherein the plurality of layers comprises a layer group of some layers on which cyclic shift multiplexing is performed mutually and other layers, and frequency division multiplexing is performed between the layer group and the other layers.

13. A radio communication method for mapping reference signals to radio resources of a plurality of layers and transmitting the reference signals, the radio communication method comprising the steps of:

generating the reference signals;

oversampling the reference signals; and mapping the reference signals oversampled, to resource elements of the layers respectively, wherein reference signals of the respective layers are mapped to resource elements of same time and frequency domains in such a manner that the reference signals are separated from each other in the frequency direction.

14. A radio communication method for mapping reference signals to radio resources of a plurality of layers and transmitting the reference signals, the radio communication method comprising the steps of:

generating the reference signals;

oversampling the reference signals;

orthogonally coding the reference signals oversampled; and mapping the reference signals orthogonally coded, to resource elements of the layers respectively, wherein reference signals of the respective layers are mapped to resource elements of same time and frequency domains and multiplexed with use of orthogonal codes.

* * * * *